United States Patent
Misra et al.

(10) Patent No.: US 8,787,688 B2
(45) Date of Patent: Jul. 22, 2014

(54) TRACKING A REFERENCE PICTURE BASED ON A DESIGNATED PICTURE ON AN ELECTRONIC DEVICE

(75) Inventors: Kiran Misra, Vancouver, WA (US); Sachin G. Deshpande, Camas, WA (US); Christopher A. Segall, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 97 days.

(21) Appl. No.: 13/291,961

(22) Filed: Nov. 8, 2011

(65) Prior Publication Data

US 2013/0094773 A1 Apr. 18, 2013

Related U.S. Application Data

(63) Continuation-in-part of application No. 13/287,015, filed on Nov. 1, 2011, which is a continuation-in-part of application No. 13/273,191, filed on Oct. 13, 2011.

(51) Int. Cl.
*G06K 9/36* (2006.01)

(52) U.S. Cl.
USPC .......................................... 382/233; 382/232

(58) Field of Classification Search
USPC .................. 382/232–253; 375/240.01–240.25
See application file for complete search history.

(56) References Cited

U.S. PATENT DOCUMENTS

| | | | |
|---|---|---|---|
| 7,403,660 B2* | 7/2008 | Hannuksela | 382/232 |
| 7,724,818 B2* | 5/2010 | Hannuksela et al. | 375/240.01 |
| 7,782,946 B2* | 8/2010 | Jeon et al. | 375/240.12 |
| 7,817,865 B2* | 10/2010 | Yang | 382/233 |
| 8,165,216 B2* | 4/2012 | Chen et al. | 375/240.24 |
| 2006/0013318 A1* | 1/2006 | Webb et al. | 375/240.25 |
| 2007/0274679 A1* | 11/2007 | Yahata et al. | 386/69 |
| 2009/0003446 A1* | 1/2009 | Wu et al. | 375/240.16 |
| 2009/0147850 A1* | 6/2009 | Pandit | 375/240.15 |
| 2010/0034254 A1* | 2/2010 | Wang | 375/240.01 |
| 2010/0111173 A1* | 5/2010 | Koo et al. | 375/240.12 |
| 2010/0189182 A1* | 7/2010 | Hannuksela | 375/240.25 |
| 2010/0238822 A1* | 9/2010 | Koyabu et al. | 370/252 |
| 2011/0019747 A1* | 1/2011 | Hannuksela et al. | 375/240.25 |
| 2013/0058408 A1 | 3/2013 | Wahadaniah et al. | |
| 2013/0077681 A1* | 3/2013 | Chen et al. | 375/240.12 |
| 2013/0215975 A1* | 8/2013 | Samuelsson et al. | 375/240.25 |

FOREIGN PATENT DOCUMENTS

WO 2013/035313 3/2013

OTHER PUBLICATIONS

"Advanced video coding for generic audiovisual services," Int. Telecommun. Union-Telecommun. (ITU-T) and Int. Standards Org./ Int. Electrotech. Comm. (ISO/IEC) JTC 1, Recommendation H.264 and ISO/IEC 14496-10 (MPEG-4) AVC, 2003.

(Continued)

*Primary Examiner* — Li Liu
(74) *Attorney, Agent, or Firm* — Austin Rapp & Hardman

(57) ABSTRACT

A method for tracking a reference picture on an electronic device is described. The method includes receiving a bitstream. The method also includes decoding a portion of the bitstream to produce a decoded reference picture. The method further includes tracking the decoded reference picture in a decoded picture buffer (DPB) with reduced overhead referencing based on a designated picture. The method additionally includes decoding a picture based on the decoded reference picture.

24 Claims, 15 Drawing Sheets

(56) References Cited

OTHER PUBLICATIONS

JCTVC-F803_d2, "WD4: Working Draft 4 of High-Efficiency Video Coding," Benjamin Bross, Woo-Jin Han, Jens-Rainer Ohm, Gary J. Sullivan, Thomas Wiegand, Joint Collaborative Team on Video Coding (JCT-VC) of ITU-T SG16 WP3 and ISO/IEC JTC1/SC29/WG11 6th Meeting: Torino, IT, Jul. 14-22, 2011, available at http://phenix.it-sudparis.eu/jct/doc_end_user/documents/6_Torino/wg11/JCTVC-F803-v4.zip.

JCTVC-F803_d1, "WD4: Working Draft 4 of High-Efficiency Video Coding" (a.k.a. Buffer Discriptions r0) Benjamin Bross, Woo-Jin Han, Jens-Rainer Ohm, Gary J. Sullivan, Thomas Wiegand, Joint Collaborative Team on Video Coding (JCT-VC) of ITU-T SG16 WP3 and ISO/IEC JTC1/SC29/WG11 6th Meeting: Torino, IT, Jul. 14-22, 2011, available at ftp://ftp.hhi.de/ahg21/JCTVC-F803_d1_Buffer_Descriptions_r0.doc.

JCTVC-F803_d1, "WD4: Working Draft 4 of High-Efficiency Video Coding" (a.k.a. Buffer Descriptions Display Process Suggestion), Benjamin Bross, Woo-Jin Han, Jens-Rainer Ohm, Gary J. Sullivan, Thomas Wiegand, Joint Collaborative Team on Video Coding (JCT-VC) of ITU-T SG16 WP3 and ISO/IEC JTC1/SC29/WG11 6th Meeting: Torino, IT, Jul. 14-22, 2011, available at ftp://ftp.hhi.de/ahg21/JCTVC-F803_d1_Buffer_Descriptions_display_process_suggestion.doc.

JCTVC-F493, "Absolute signaling of reference pictures," Rickard Sjöberg, Jonatan Samuelsson, Joint Collaborative Team on Video Coding (JCT-VC) of ITU-T SG16 WP3 and ISO/IEC JTC1/SC29/WG11 6th Meeting: Torino, IT, Jul. 14-22, 2011, available at http://phenix.int-evry.fr/jct/doc_end_user/documents/6_Torino/wg11/JCTVC-F493-v8.zip.

Misra, K., Deshpande, S., and Segall, A., "Long Term Picture Referencing Using Wrapped POC," Joint Collaborative Team on Video Coding (JCT-VC) of ITU-T SG16 WP3 and ISO/IEC JTC1/SC29/WG11 $7^{th}$ Meeting JCTVC-G713, Nov. 2011.

International Search Report issued for International Application No. PCT/JP2012/077021 on Dec. 18, 2012.

International Search Report issued for International Patent Application No. PCT/JP2013/002505 on Jul. 9, 2013.

JCTVC-G715, "AHG18/21: Absolute signaling for resolution switching," Kiran Misra, Sachin Deshpande, Louis Kerofsky, Andrew Segall, Joint Collaborative Team on Video Coding (JCT-VC) of ITU-T SG16 WP3 and ISO/IEC JTC1/SC29/WG11 7th Meeting: Geneva, CH, Nov. 21-30, 2011.

JCTVC-H0468, "AHG21: Flexible signalling of long term reference pictures," Viktor Whadaniah, ChongSoon Lim, Joint Collaborative Team on Video Coding (JCT-VC) of ITU-T SG16 WP3 and ISO/IEC JTC1/SC29/WG11 8th Meeting: San Jose, CA, USA, Feb. 1-10, 2012.

JCTVC-H0502, "Signaling of long-term reference pictures in the PPS," Ye-Kui Wang, Ying Chen, Joint Collaborative Team on Video Coding (JCT-VC) of ITU-T SG16 WP3 and ISO/IEC JTC1/SC29/WG11 8th Meeting: San Jose, CA, USA, Feb. 1-10, 2012.

JCTVC-J0116r1, "AHG13: Signalling of long-term reference pictures in the SPS," Adarsh K. Ramasubramonian, Ye-Kui Wang, Ying Chen, Joint Collaborative Team on Video Coding (JCT-VC) of ITU-T SG16 WP3 and ISO/IEC JTC1/SC29/WG11 10th Meeting: Stockhom, SE, Jul. 11-20, 2012.

\* cited by examiner

TRACKING A REFERENCE PICTURE BASED ON A DESIGNATED PICTURE ON AN ELECTRONIC DEVICE

RELATED REFERENCES

This application is a continuation-in-part of U.S. patent application Ser. No. 13/287,015, entitled "TRACKING A REFERENCE PICTURE BASED ON A DESIGNATED PICTURE ON AN ELECTRONIC DEVICE," filed on Nov. 1, 2011, which is a continuation-in-part of U.S. patent application Ser. No. 13/273,191, entitled "TRACKING A REFERENCE PICTURE ON AN ELECTRONIC DEVICE," filed on Oct. 13, 2011, both of which are hereby incorporated by reference herein, in their entirety.

TECHNICAL FIELD

The present disclosure relates generally to electronic devices. More specifically, the present disclosure relates to enabling tracking of a reference picture.

BACKGROUND

Electronic devices have become smaller and more powerful in order to meet consumer needs and to improve portability and convenience. Consumers have become dependent upon electronic devices and have come to expect increased functionality. Some examples of electronic devices include desktop computers, laptop computers, cellular phones, smart phones, media players, integrated circuits, etc.

Some electronic devices are used for processing and displaying digital media. For example, portable electronic devices now allow for digital media to be consumed at almost any location where a consumer may be. Furthermore, some electronic devices may provide download or streaming of digital media content for the use and enjoyment of a consumer.

The increasing popularity of digital media has presented several problems. For example, efficiently representing high-quality digital media for storage, transmittal and playback presents several challenges. As can be observed from this discussion, systems and methods that represent digital media more efficiently may be beneficial.

DETAILED DESCRIPTION

Figure 1:
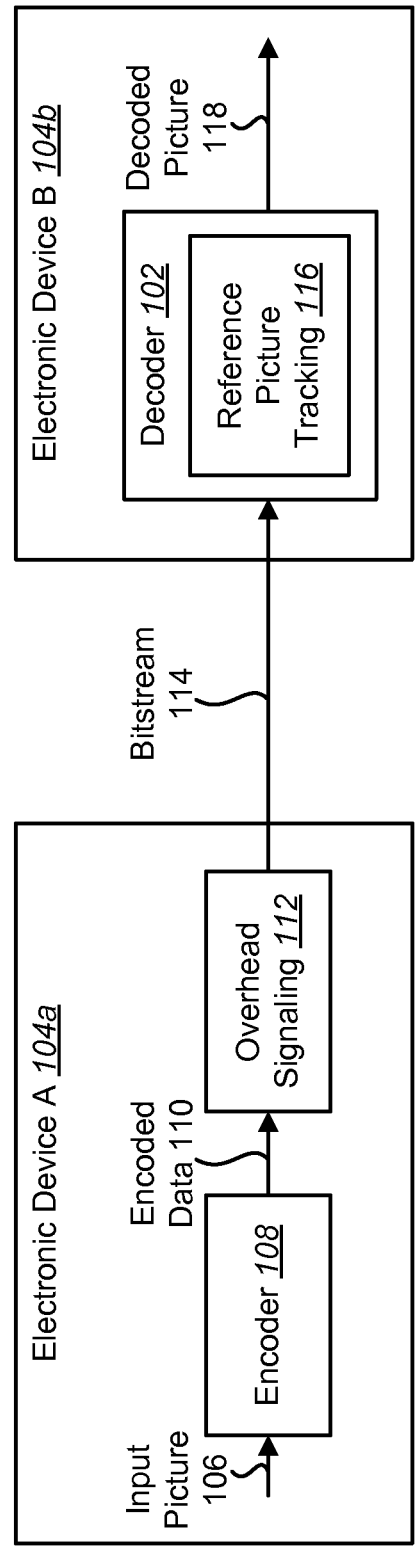
FIG. 1 is a block diagram illustrating an example of one or more electronic devices in which systems and methods for tracking a reference picture based on a designated picture may be implemented.

A method for tracking a reference picture on an electronic device is described. The method includes receiving a bitstream. The method also includes decoding a portion of the bitstream to produce a decoded reference picture. The method further includes tracking the decoded reference picture in a decoded picture buffer (DPB) with reduced overhead referencing based on a designated picture. The method additionally includes decoding a picture based on the decoded reference picture. The designated picture may be an instantaneous decoding refresh (IDR) picture. Additionally, a buffer description of the decoded reference picture may include a picture order count (POC), a cycle parameter, a temporal identifier and a scaling parameter.

Tracking the decoded reference picture may include determining a cycle parameter based on the designated picture. The cycle parameter may be reset based on the designated picture.

Tracking the decoded reference picture may include determining a picture order count (POC) based on the designated picture. A picture order count (POC) sequence may be reset based on the designated picture.

A resolution of the decoded reference picture may be different from a resolution of the picture. The method may also include processing transform coefficients of the decoded reference picture based on a scaling parameter to decode the picture.

Tracking the decoded reference picture may include tracking a decoded reference picture collection that includes the decoded reference picture. Tracking the decoded reference picture may also include obtaining a buffer description and modifying the buffer description. Modifying the buffer description may include deleting an entry, adding an entry and/or replacing an entry.

An electronic device configured for tracking a reference picture is also described. The electronic device includes a processor and instructions stored in memory that is in electronic communication with the processor. The electronic device receives a bitstream. The electronic device also decodes a portion of the bitstream to produce a decoded reference picture. The electronic device further tracks the decoded reference picture in a decoded picture buffer (DPB) with reduced overhead referencing based on a designated picture. The electronic device additionally decodes a picture based on the decoded reference picture.

The systems and methods disclosed herein describe several configurations for tracking a reference picture based on a designated picture on an electronic device. For example, the systems and methods disclosed herein describe tracking a decoded reference picture in a decoded picture buffer (DPB) with reduced overhead referencing. For instance, several approaches for long term reference picture signaling are described. It should be noted that the decoded picture buffer (DPB) may be a buffer holding decoded pictures for reference, output reordering or output delay specified for a hypothetical reference decoder.

On an electronic device, a decoded picture buffer (DPB) may be used to store reconstructed (e.g., decoded) pictures at a decoder. These stored pictures may then be used, for example, in an inter-prediction mechanism. When pictures are decoded out of order, the pictures may be stored in the DPB so they can be displayed later in order.

In the H.264 or advance video coding (AVC) standard, DPB management (e.g., deletion, addition of pictures, reordering of pictures, etc.) is carried out using memory management control operations (MMCO). For the upcoming high efficiency video coding (HEVC) standard, more reliable DPB management approaches are under consideration. One example of a more reliable approach is based on absolute signaling of reference pictures as detailed in "Absolute signaling of reference pictures" from the Joint Collaborative Team on Video Coding (JCT-VC) document JCTVC-F493.

JCTVC-F493 outlines absolute signaling of reference pictures to identify which reference pictures should be kept in the decoded picture buffer (DPB). In particular, it outlines two different approaches to identify which reference pictures are to be kept in the DPB based on a picture order count (POC). The picture order count (POC) may be a variable that is associated with each encoded picture and has a value that is increasing with increasing picture position in an output order with wrap-around.

In one example, assume that all pictures have a temporal identifier (temporalID)=0. Further assume that the current POC=5 and that the current DPB contains={3, 2}. Additionally assume that a definition in the Picture Parameter Set (PPS) is: BufferDescription0={deltaPOC=−1, temporalID=0}, {deltaPOC=−2, temporalID=0}. deltaPOC specifies the distance in POC value of reference picture from the current picture, where the current picture may be the picture being decoded. One approach given is to reference a buffer description in the PPS. In this approach, the slice header of a picture with POC=5 contains a reference to BufferDescription0 in the PPS. Assume that an action is to drop a decoded picture with POC=2 from the DPB and to add a decoded picture with POC=4 to the DPB. As a result, the DPB then contains={4, 3}.

In one configuration, the buffer description is defined as two lists denoted POCBD and TemporalIDBD and a variable NumberOfPicturesInBD present for all pictures. This is such that POCBD contains picture order count values of reference pictures and TemporalIDBD contains the corresponding temporal identifier of the reference picture, both lists containing NumberOfPicturesInBD values.

It should be noted that a temporalID may be defined as follows in the Joint Collaborative Team on Video Coding (JCT-VC) document JCTVC-F803: "temporalID specifies a temporal identifier for the NAL unit. The value of temporalID shall be the same for all NAL units of an access unit. When an access unit contains any NAL unit with the nal_unit_type equal to 5, temporalID shall be equal to 0." It should be noted that NAL may be an abbreviation for "network abstraction layer."

Another approach is to explicitly signal the contents of the DPB using a delta POC with respect to the current POC. In this approach, the slice header of a picture with POC=5 contains {deltaPOC=−1, temporalID=0} and {deltaPOC=−2, temporalID=0}. Assume that an action is to drop a decoded picture with POC=2 from the DPB and to add a decoded picture POC=4 to the DPB. As a result, the new DPB contains={4, 3}.

Some advantages of the approaches given by JCTVC-F493 are as follows. The approaches in JCTVC-F493 provide a simple mechanism. Furthermore, a loss of a picture is easily detected at the decoder. Additionally, dropping of entire layers of pictures with a higher temporal ID may be detected and well supported.

However, some disadvantages of the approaches given in JCTVC-F493 are given hereafter. The bit overhead for signaling a long-term reference picture can become large. Furthermore, a fixed number of bits may be allocated to communicate a POC. As a result, when a maximum value allowed by the number of bits being used is reached, the POC numbering should wrap around to 0. Thus, it may not be possible to guarantee that pictures can be uniquely identified using the POC.

The systems and methods disclosed herein may help to mitigate these disadvantages. In particular, the systems and methods disclosed herein may be beneficial by reducing the overhead associated with absolute long term picture referencing and may enable pictures to be uniquely identified (e.g., a long-term (reference) picture may not be confused with other short-term or long-term pictures and vice-versa).

The systems and methods disclosed herein may provide one or more additional benefits that are described as follows. One or more configurations of the systems and methods disclosed herein may make full use of the available POC numbering space [0, . . . , MaxPOC−1], where MaxPOC= $2^{log2\_max\_pic\_order\_cnt\_minus4+4}$ and log 2_max_pic_order_cnt_minus4 specifies the value of the variable MaxPOC that is used in the decoding process for picture order count. For example, one prior approach to resolving re-use of [0, . . . , MaxPOC−1] after a POC wrap-around advocates that the POC currently in use are stepped over when assigning an identifier (e.g., a POC number) to a picture. This results in part of the POC space not being used. However, the systems and methods disclosed herein may resolve the stepping over of POC and the associated POC space shrinkage issue.

Another benefit may be that some configurations of the systems and methods disclosed herein for signaling may be self-contained in each picture. Thus, error resilience may be better compared to a scheme that relies on information propagation from previous pictures (that could get lost or dropped). For example, one configuration of the decoded picture buffer (DPB) description does not rely on information embedded in other pictures to maintain the same DPB as an encoder.

Yet another benefit of some configurations of the systems and methods disclosed herein may be that if a picture is lost, the loss can be detected as soon as a buffer description is available at the decoder (which is at the next received picture). This allows the decoder to take corrective action. Yet another benefit is that if the POC resolution is sufficient, no extra bits are required.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating an example of one or more electronic devices 104 in which systems and methods for tracking a reference picture based on a designated picture may be implemented. In this example, electronic device A 104a and electronic device B 104b are illustrated. However, it should be noted that the features and/or functionality described in relation to electronic device A 104a and electronic device B 104b may be combined into a single electronic device in some configurations.

Electronic device A 104a includes an encoder 108 and an overhead signaling module 112. Each of the elements included within electronic device A 104a (e.g., the encoder 108 and the overhead signaling module 112) may be implemented in hardware, software or a combination of both.

Electronic device A 104a may obtain an input picture 106. In some configurations, the input picture 106 may be captured on electronic device A 104a using an image sensor, retrieved from memory and/or received from another electronic device.

The encoder 108 may encode the input picture 106 to produce encoded data 110. For example, the encoder 108 may encode a series of input pictures 106 (e.g., video). In one configuration, the encoder 108 may be a high-efficiency video coding (HEVC) encoder. The encoded data 110 may be digital data (e.g., a bitstream).

The overhead signaling module 112 may generate overhead signaling based on the encoded data 110. For example, the overhead signaling module 112 may add overhead data to the encoded data 110 such as slice header information, picture parameter set (PPS) information, picture order count (POC), reference picture designation, etc. In some configurations, the overhead signaling module 112 may produce a wrap indicator that indicates a transition between two sets of pictures.

More detail on kinds of overhead signaling that may be produced by electronic device A 104a is given below. In particular, none, one or more of the parameters, indicators or kinds of information described in relation to decoding below may be produced by the overhead signaling module 112, depending on the configuration. It should be noted that the overhead signaling module 112 may be included within the encoder 108 in some configurations. The overhead signaling module 112 may enable picture tracking with reduced overhead referencing.

The encoder 108 (and overhead signaling module 112, for example) may produce a bitstream 114. The bitstream 114 may include encoded picture data based on the input picture 106. In some configurations, the bitstream 114 may also include overhead data, such as slice header information, PPS information, etc. More detail on overhead data is given below. As additional input pictures 106 are encoded, the bitstream 114 may include one or more encoded pictures. For instance, the bitstream 114 may include one or more encoded reference pictures and/or other pictures.

The bitstream 114 may be provided to a decoder 102. In one example, the bitstream 114 may be transmitted to electronic device B 104b using a wired or wireless link. In some cases, this may be done over a network, such as the Internet or a Local Area Network (LAN). As illustrated in FIG. 1, the decoder 102 may be implemented on electronic device B 104b separately from the encoder 108 on electronic device A 104a. However, it should be noted that the encoder 108 and decoder 102 may be implemented on the same electronic device in some configurations. In an implementation where the encoder 108 and decoder 102 are implemented on the same electronic device, for instance, the bitstream 114 may be provided over a bus to the decoder 102 or stored in memory for retrieval by the decoder 102.

The decoder 102 may be implemented in hardware, software or a combination of both. In one configuration, the decoder 102 may be a high-efficiency video coding (HEVC) decoder. The decoder 102 may receive (e.g., obtain) the bitstream 114. The decoder 102 may generate a decoded picture 118 (e.g., one or more decoded pictures 118) based on the bitstream 114. The decoded picture 118 may be displayed, played back, stored in memory and/or transmitted to another device, etc.

The decoder 102 may include a reference picture tracking module 116. The reference picture tracking module 116 may enable the decoder 102 to track a reference picture with reduced overhead referencing. For example, the reference picture tracking module 116 may track a reference picture in a decoded picture buffer (DPB) using less overhead than is needed with prior approaches, such as approaches given in JCTVC-F493.

In prior approaches, for example, non-reduced overhead referencing may be used to specify the relationship between a current picture and a long term reference picture. In prior approaches, for instance, the relationship between a current picture and a long term reference picture may be specified by increasing the POC numbering space and thereby avoiding the POC wraparound issue. However, increasing the POC numbering space can only be achieved at the expense of an increased bit-requirement for POC. This example is one of several possible mechanisms that can be used to avoid the POC wrap around issue in prior approaches. However, this particular example demonstrates the larger overhead aspect for long-term pictures in prior approaches.

JCTVC-F493, for example, used a longterm_poc[i] field in a buffer description that specified an absolute POC and a longterm_temporal_id[i] field in the buffer description that specified a temporal ID for a long term picture. This was later removed in JCTVC-F803, which did not include a mechanism for long term pictures. In subsequent discussions, an approach of stepping over (long term picture) POCs was given.

Problems may arise with the prior approaches. First, a large amount of overhead data may be needed to specify the relationship between a long term reference picture and another picture. For instance, a large number of overhead bits may need to be allocated to adequately represent an integer number difference in POC between the long term reference picture and another picture. Second, if a limited number of bits is specified to represent this difference, the difference may be ambiguously indicated when numbers are reused (because of number set cycling, for example).

The reference picture tracking module 116 may use one or more approaches or methods that are described in greater detail below in order to reduce referencing overhead. Some examples include using a cycle parameter and decrementing the cycle parameter based on wrap indicators or transitions between sets of pictures.

It should be noted that a "reference picture" described herein may instead be a reference picture collection (e.g., group of frames) in some configurations. Accordingly, a "decoded reference picture" described herein may instead be a "decoded reference picture collection" in some configurations. For example, a reference picture collection may be applied in place of a single reference picture as described in conjunction with the systems and methods disclosed herein. The reference picture collection may include one or more reference pictures. Two or more reference pictures in the reference picture collection may correspond to the same time instant or different (e.g., similar) time instances. For example, in a 3-dimensional (3D) coding scenario, a bitstream 114 contains multiple pictures, where some pictures may refer to a left view and some pictures may refer to a right view. Thus, the reference picture collection may identify both the left and right pictures that correspond to a specific display time.

In another example, such as a scalable coding scenario, a bitstream may contain pictures of different resolutions. In this example, the reference picture collection may include (e.g., identify) different resolution versions of the same picture.

Figure 2:
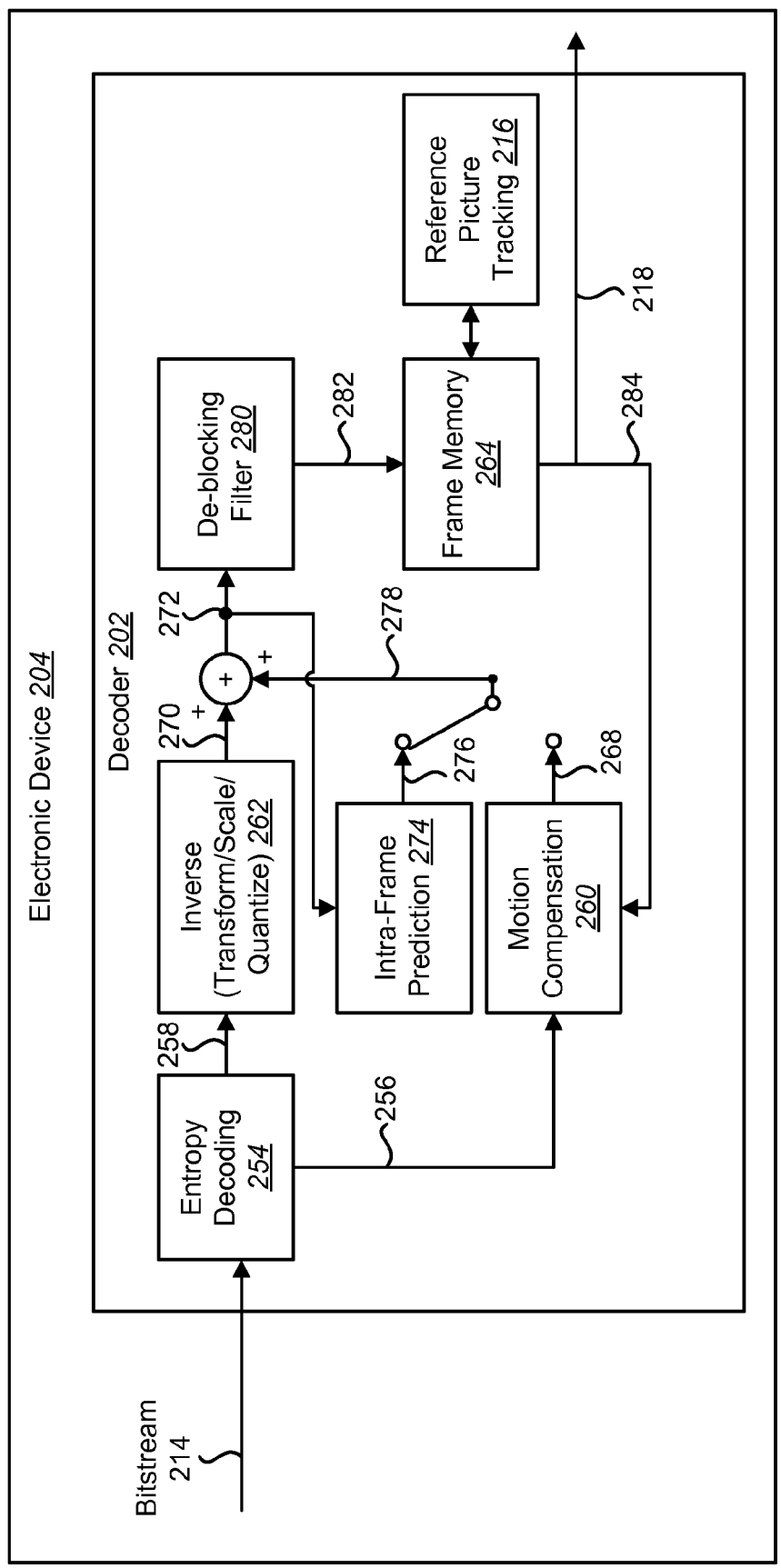
FIG. 2 is a block diagram illustrating one configuration of a decoder.

FIG. 2 is a block diagram illustrating one configuration of a decoder 202. The decoder 202 may be included in an electronic device 204. For example, the decoder 202 may be a high-efficiency video coding (HEVC) decoder. The decoder 202 and/or one or more of the elements illustrated as included in the decoder 202 may be implemented in hardware, software or a combination of both. The decoder 202 may receive a bitstream 214 (e.g., one or more encoded pictures included in the bitstream 214) for decoding. In some configurations, the received bitstream 214 may include received overhead information, such as a received slice header, received PPS, received buffer description information, etc. The encoded pictures included in the bitstream 214 may include one or more encoded reference pictures and/or one or more other encoded pictures.

Received symbols (in the one or more encoded pictures included in the bitstream 214) may be entropy decoded by an entropy decoding module 254, thereby producing a motion information signal 256 and quantized, scaled and/or transformed coefficients 258.

The motion information signal 256 may be combined with a portion of a reference frame signal 284 from a frame memory 264 at a motion compensation module 260, which may produce an inter-frame prediction signal 268. The quantized, descaled and/or transformed coefficients 258 may be inverse quantized, scaled and inverse transformed by an inverse module 262, thereby producing a decoded residual signal 270. The decoded residual signal 270 may be added to a prediction signal 278 to produce a combined signal 272. The prediction signal 278 may be a signal selected from either the inter-frame prediction signal 268 or an intra-frame prediction signal 276 produced by an intra-frame prediction module 274. In some configurations, this signal selection may be based on (e.g., controlled by) the bitstream 214.

The intra-frame prediction signal 276 may be predicted from previously decoded information from the combined signal 272 (in the current frame, for example). The combined signal 272 may also be filtered by a de-blocking filter 280. The resulting filtered signal 282 may be written to frame memory 264. The resulting filtered signal 282 may include a decoded picture.

The frame memory 264 may include a decoded picture buffer (DPB) as described herein. The DPB may include one or more decoded pictures that may be maintained as short or long term reference frames. The frame memory 264 may also include overhead information corresponding to the decoded pictures. For example, the frame memory 264 may include slice headers, picture parameter set (PPS) information, cycle parameters, buffer description information, etc. One or more of these pieces of information may be signaled from an encoder (e.g., encoder 108, overhead signaling module 112). The frame memory 264 may provide a decoded picture 218.

The decoder 202 may include a reference picture tracking module 216. The reference picture tracking module 216 may track one or more reference pictures in the frame memory 264 with reduced referencing overhead. In one example, the reference picture tracking module 216 may track long term reference pictures using a cycle parameter and modifying (e.g., decrementing) the cycle parameter based on received wrap indicators. In another example, an update of all reference picture cycle parameters may be carried out with respect to the picture being decoded. This update procedure may be executed once for the current picture (e.g., the picture being decoded). The transition between cycles may be kept track of implicitly with the help of the POC. At times the cycle parameter may be increased (when the transition is from picture set 'n' to picture set 'n−1' as may occur in out-of-order picture decoding, for example). Greater detail on one or more approaches to tracking a reference picture based on a designated picture is given below.

Some configurations of the systems and methods disclosed herein may use a modified buffer description. Examples of the modified buffer description are given hereafter. The buffer description may be modified to include "POC," "poc_cycle" and "temporalID" for long-term reference pictures. It should be noted that "poc_cycle" may be one example of the cycle parameter described herein. The (modified) buffer description, (modified) syntaxes and/or parameters given in accordance with the systems and methods disclosed herein may enable reduced overhead referencing.

Table (1) below gives one example comparing the buffer description within the PPS in a prior approach and one proposed approach in accordance with the systems and methods disclosed herein. The prior approach is detailed in the "candidate working draft text of ad-hoc group 21" document (AHG21) that was created to further the work in JCTVC-F493. It should be noted that AHG21 (JCTVC-F803) separately groups and specifies "negative pictures" (e.g., those that have negative deltaPOC values) and "positive pictures" (e.g., those pictures that have positive deltaPOC values).

TABLE (1)

| AHG21 Buffer Description | Proposed Buffer Description |
| --- | --- |
| $deltaPOC_0, temporalID_0$ | $deltaPOC_0, temporalID_0$ |
| $deltaPOC_1, temporalID_1$ | $deltaPOC_1, temporalID_1$ |
| $deltaPOC_2, temporalID_2$ | $deltaPOC_2, temporalID_2$ |
| $deltaPOC_3, temporalID_3$ | $(POC_0, poc\_cycles_0, temporalID_3)$ |
| $deltaPOC_4, temporalID_4$ | $(POC_1, poc\_cycles_1, temporalID_4)$ |

In Table (1) illustrated above, $(POC_0, poc\_cycles_0, temporalID_3)$ and $(POC_1, poc\_cycles_1, temporalID_4)$ represent long-term (reference) pictures. It should be noted that the buffer description may contain two lists POCBD and TemporalIDBD for short-term reference pictures (corresponding to POC and TemporalID fields, respectively). Furthermore, the buffer description may contain three lists: POCBD, POC_CYCLE_BD and TemporalIDBD for long-term reference pictures (corresponding to POC, poc_cycle and TemporalID fields, respectively).

In some configurations, multiple buffer descriptions are defined in the picture parameter set. Each buffer description, with index i, contains lists for reference pictures: POCBD_pps[i], POC_CYCLE_pps[i], DeltaPOCBD_pps[i] and TemporalIDBD_pps[i] and a variable NumberOfPicturesInBD_pps[i]. The i-th list of POCBD_pps[i] contains picture order count values of reference pictures. The i-th list of POC_

CYCLE_pps[i] contains poc_cycle values of reference pictures. The i-th list of TemporalIDBD_pps[i] contains the corresponding temporal identifier of the reference picture. Furthermore, the i-th list of TemporalIDBD_pps[i] contains NumberOfPicturesInBD_pps[i] entries. The collection of lists are referred to as POC_pps, POC_CYCLE_pps, DeltaPOCBD_pps and TemporalIDBD_pps. For deltaPOC referencing, a single list DeltaPOCBD_pps[i] contains the deltaPOC values of reference pictures. It should be noted that in the candidate working draft text of ad-hoc group 21, DeltaPOCBD_pps may be referred to as DeltaPOCBD. The sum of the entries in the list POCBD_pps[i] and the list DeltaPOCBD_pps[i] is given by the value NumberOfPicturesInBD_pps[i]. Moreover, the number of entries in POCBD_pps[i] and POC_CYCLE_pps[i] are the same.

It should be noted that the syntax given in AHG21 does not adequately support fixed long term referencing. Listing (1) below illustrates one example of a bitstream syntax modification required to a candidate working draft text of ad-hoc group 21 (AHG21). The changes due to the prior approach are given in bold text in Listing (1).

---

Listing (1)

```
/* Picture parameter set raw byte sequence payload (RBSP) syntax
*/
pic_parameter_set_rbsp( ) {
    ...
    bits_for_temporal_id_in_buffer_descriptions
    positive_pictures_in_buffer_descriptions_flag
    number_of_bds
    if( number_of_bds > 0 ) {
        for(i = 0; i < number_of_bds; i++){
            number_of_negative_pictures_pps[i]
            for( j = 0; j < number_of_negative_pictures_pps[i]; j++ ) {
                negative_delta_poc_minus_one_pps[i][j]
                if( bits_for_temporal_id_in_buffer_descriptions > 0 )
                    temporal_id_negative_pps[i][j]
            }
            if( positive_pictures_in_buffer_descriptions_flag ){
                number_of_positive_pictures_pps[i]
                for( j = 0; j < number_of_positive_pictures_pps[i];
                    j++ ) {
                    delta_poc_minus_one_pps[i][j]
                    if( bits_for_temporal_id_in_buffer_descriptions >
                    0 )
                        temporal_id_positive_pps[i][j]
                }
            }
            number_of_longterm_pictures_pps[i]
            for( j = 0; j < number_of_longterm_pictures_pps[i]; j++ ) {
                poc_pps[i][j]
                poc_cycle_pps[i][j]
                if( bits_for_temporal_id_in_buffer_descriptions > 0 )
                    temporal_id_poc_pps[i][j]
            }
        }
    }
    ...
}
```

--- positive_pictures_in_buffer_descriptions_flag specifies if there are any buffer description pictures with positive deltaPOC. bits_for_temporal_id_in_buffer_descriptions specifies the number of bits used for temporal_id_negative_pps[i][j], temporal_id_positive_pps[i][j], temporal_id_poc_pps[i][j], temporal_id_negative[i] and temporal_id_positive[i]. number_of_bds specifies the number of buffer descriptions in a picture parameter set. number_of_negative_pictures_pps[i] specifies the number of entries in the list DeltaPOCBD_pps[i] with negative values. number_of_negative_pictures_pps[i] defines the value of OffsetBD[i] as OffsetBD[i]=number_of_negative_pictures_pps[i]. The value of number_of_negative_pictures_pps[i] shall be in the range of 0 to max_num_ref_frames, inclusive. negative_delta_poc_minus_one_pps[i][j] specifies an absolute distance in POC value.

negative_delta_poc_minus_one_pps[i][j] defines the value of the variable DeltaPOCBD_pps[i][j] as DeltaPOCBD_pps[i][j]=−(negative_delta_poc_minus_one_pps[i][j]+1) if j equals 0. Also, negative_delta_poc_minus_one_pps[i][j] defines the value of the variable DeltaPOCBD_pps[i][j] as DeltaPOCBD_pps[i][j]=DeltaPOCBD_pps[i][j−1]−(negative_delta_poc_minus_one_pps[i][j]+1) if j>0. DeltaPOCBD_pps[i][j] shall be in the range of −1 to −MaxPOC/2.

temporal_id_negative_pps[i][j] specifies a temporal identifier and shall be represented by bits_for_temporal_id_in_buffer_descriptions bits. temporal_id_negative_pps[i][j] is added to the list TemporalIDBD_pps[i]. In one configuration of the above, the addition operation is an appending operation. In another configuration, the appending operation is an operation that replaces items in the list in a predefined order. temporal_id_negative_pps[i][j] shall be in the range of 0 to max_temporal_layers_minus1, inclusive. max_temporal_layers_minus1+1 specifies the maximum number of temporal layers present in a sequence.

number_of_positive_pictures_in_bd_pps[i] specifies the number of entries in the list DeltaPOCBD_pps[i] that have a positive value. The value of the number_of_positive_pictures_in_bd_pps[i] shall be in the range of 0 to max_num_ref_frames-OffsetBD[i], inclusive. When the number_of_positive_pictures_in_bd_pps[i] syntax element is not present, the value of number_of_positive_pictures_in_bd_pps[i] shall be inferred to be equal to 0.

delta_poc_minus_one_pps[i][j] specifies an absolute distance in POC value. delta_poc_minus_one_pps[i][j] defines the value of the variable DeltaPOCBD_pps[i][j+OffsetBD[i]] as DeltaPOCBD_pps[i][j+OffsetBD[i]]=delta_poc_minus_one_pps[i][j]+1 if j is equal to 0 and as DeltaPOCBD_pps[i][j+OffsetBD[i]]=DeltaPOCBD_pps[i][j−1+OffsetBD[i]]+delta_poc_minus_one_pps[i][j]+1 if j>0. DeltaPOCBD_pps[i][j+OffsetBD[i]] shall be in the range of 1 to MaxPOC/2-1.

temporal_id_positive_pps[i][j] specifies a temporal identifier and shall be represented by bits_for_temporal_id_in_buffer_descriptions bits. temporal_id_positive_pps[i][j] defines the value of the variable TemporalIDBD_pps[i][j] as TemporalIDBD_pps[i][j+OffsetBD[i]]=temporal_id_positive_pps[i][j]. temporal_id_positive_pps[i][j] shall be in the range of 0 to max_temporal_layers_minus1, inclusive.

Examples of descriptions of the parameters in Listing (1) are given as follows. number_of_longterm_pictures_pps[i] specifies the number of entries in the list POCBD_pps[i] and POC_CYCLE_BD_pps[i]. The value of number_of_longterm_pictures_pps[i] shall be in the range of 0 to max_num_ref_frames, inclusive. max_num_ref_frames specifies the maximum number of short term and long term reference frames. poc_pps[i][j] specifies POC value and defines the value of the variable POCBD_pps[i][j] as POCBD_pps[i][j]=poc_pps[i][j]. poc_pps[i][j] shall be in the range of 0 to MaxPOC-1.

poc_cycle_pps[i][j] specifies poc_cycle (e.g., the cycle parameter) value and defines the value of the variable POC_CYCLE_BD_pps as: POC_CYCLE_BD_pps[i][j]=poc_cycle_pps[i][j]. poc_cycle_pps[i][j] (e.g., the cycle parameter) may be less than or equal to zero in some configurations. In such a case, a signed integer may be used to represent the cycle parameter. In other configurations, an unsigned integer may be used to represent the cycle parameter.

temporal_id_poc_pps[i][j] specifies a temporal identifier and shall be present if bits_for_temporal_id_in_buffer_descriptions>0. temporal_id_poc_pps[i][j] defines the value of the entries in the list TemporalIDBD_pps[i]. temporal_id_poc_pps[i][j] is added to the list TemporalIDBD_pps[i]. In one configuration of the above, the addition operation is an appending operation. In another configuration, the appending (or addition) operation is an operation that replaces items in the list in a predefined order. temporal_id_poc_pps[i][j] shall be in the range of 0 to max_temporal_layers_minus1, inclusive. max_temporal_layers_minus1+1 specifies the maximum number of temporal layers present in a sequence. It should be noted that the variable NumberOfPicturesInBD_pps[i] may be calculated as number_of_negative_pictures_pps[i]+number_of_positive_pictures_pps[i]+number_of_longterm_pictures_pps[i].

The negative and positive deltaPOC values for the reference picture transmitted in the i-th picture parameter set buffer description are added to the list DeltaPOCBD_pps[i]. In one configuration of the above, the addition operation is an appending operation. In another configuration, the appending (or addition) operation is an operation that replaces items in the list in a predefined order.

Listing (2) below illustrates an alternative example configuration where multiple buffer descriptions may be created within a PPS with different cycle parameters (e.g., poc_cycles) using the following syntax. The changes due to the prior approach are given in bold text in Listing (2).

---
Listing (2)
---

```
/* Picture parameter set RBSP syntax
*/
pic_parameter_set_rbsp( ) {
    ...
    bits_for_temporal_id_in_buffer_descriptions
    positive_pictures_in_buffer_descriptions_flag
    number_of_bds
    if( number_of_bds > 0 ) {
        for(i = 0; i < number_of_bds; i++){
            number_of_negative_pictures_pps[i]
            for( j = 0; j < number_of_negative_pictures_pps[i]; j++ ) {
                negative_delta_poc_minus_one_pps[i][j]
                if( bits_for_temporal_id_in_buffer_descriptions > 0 )
                    temporal_id_negative_pps[i][j]
            }
            if( positive_pictures_in_buffer_descriptions_flag ){
                number_of_positive_pictures_pps[i]
                for( j = 0; j < number_of_positive_pictures_pps[i];
                j++ ) {
                    delta_poc_minus_one_pps[i][j]
                    if( bits_for_temporal_id_in_buffer_descriptions >
                    0 )
                        temporal_id_positive_pps[i][j]
                }
            }
            number_of_longterm_pictures_pps[i]
            for( j = 0; j < number_of_longterm_pictures_pps[i]; j++ ) {
                poc_pps[i][j]
                poc_cycle_pps[i][j]
                poc_cycle_steps_flag
                if (poc_cycle_steps_flag) {
                    poc_cycle_steps
                }
                if( bits_for_temporal_id_in_buffer_descriptions > 0 )
                    temporal_id_poc_pps[i][j]
            }
        }
    }
    ...
}
```

In Listing (2), examples of descriptions of further parameters are given as follows. When set to 1, poc_cycle_steps_ flag specifies that additional buffer descriptions shall be generated for the signaled buffer description model that are identical to the signaled buffer description model except for the poc_cycle count. poc_cycle_steps_flag shall be 0 by default. Furthermore, poc_cycle_steps specifies the number of additional buffer descriptions that shall be generated for the signaled buffer description model. The additional buffer descriptions shall be identical to the signaled buffer description except that the poc_cycle count shall be decreased. In one configuration, the additional buffer descriptions generated have poc_cycle_pps[i][j] values of −1, −2, −3, . . . , −(poc_cycle_steps).

In some configurations, resolution switching may be enabled within a bitstream. In these configurations, the resolution of the reference pictures may be different from the resolution of the current picture. Thus, it may be beneficial to know which mechanism may be used to scale the reference pictures to the right resolution. One way of signaling the mechanism is to signal it explicitly along with the buffer description. For example, an encoder 108 (e.g., overhead signaling module 112) may signal a scaling parameter s to the decoder 102. Thus, an alternative buffer description may be shown in Table (2).

TABLE (2)

Alternative Buffer Description deltaPOC$_0$, temporalID$_0$
deltaPOC$_1$, temporalID$_1$
deltaPOC$_2$, temporalID$_2$, s$_0$
(POC$_0$, poc_cycles$_0$, temporalID$_3$, s$_1$)
(POC$_1$, poc_cycles$_1$, temporalID$_4$, s$_2$)

In Table (2), the first two entries have the resolution matching that of the current picture. However the remaining three entries have a different resolution and may use the scaling parameter, s$_0$, S$_1$, s$_2$, respectively. The scaling parameter may be signaled selectively. For example, it may be signaled only if the current picture and the reference picture have a different resolution. In another configuration, the scaling parameter may always be signaled. In yet another configuration the scaling parameter may be inferred implicitly (by a decoder), for example, by using a look up table indexed by current picture characteristics (e.g., resolution) and the referenced picture characteristics (e.g., resolution).

In one configuration, the scaling parameter signals (e.g., indicates) the change in horizontal and/or vertical resolution in pixels. In one configuration, the scaling parameter signals (e.g., indicates) the ratio between the desired and original horizontal and/or vertical resolution. In one configuration, the scaling parameter is a 2-tuple, where the first value identifies scaling for the horizontal resolution and the second value identifies scaling for the vertical resolution.

In some configurations, the transform coefficients of the reference picture may be processed based on the scaling parameter to obtain the desired resolution. This may be beneficial to enable better resolution adaptation by allowing only block sizes larger than a certain threshold while coding the reference picture.

In yet another configuration, the reconstructed pixels of the reference picture may be processed based on the scaling parameter to obtain the desired resolution. It should be noted that these configurations may be applied to all reference picture indexing schemes disclosed herein.

Listing (3) illustrates another example of syntax modification for the PPS from AHG21. In particular, Listing (3) illustrates one example of buffer description syntax used in slice headers as outlined in AHG21. However, modifications to the syntax given in AHG21 in accordance with the systems and methods disclosed herein are denoted in bold text in Listing (3).

Listing (3)

```
/* Buffer description
*/
buffer_description( ) {
    bd_reference_flag
    if(bd_reference_flag == 1) {
        bd_idx
        bd_poc_cycle_update_flag
        if (bd_poc_cycle_update_flag == 1)
            //begin for loop of long term pictures poc_cycle override
            for( j = 0; j < number_of_longterm_pictures_pps[bd_idx];
            j++ ) {
                poc_cycle_pps_override[j]
            }
            //end of for loop of long term pictures poc_cycle override
    } else {
        number_of_negative_pictures
        //begin for loop for negative deltaPOC pictures
        for( i = 0; i < number_of_negative_pictures; i++ ) {
            ...
        }
        // end of for loop for negative deltaPOC pictures
        if( positive_pictures_in_buffer_descriptions_flag ){
            ...
        }
        number_of_longterm_pictures
        // begin for loop of explicitly signaled long term pictures
        for( j = 0; j < number_of_longterm_pictures; j++ ) {
            poc[j]
            poc_cycle[j]
            if( bits_for_temporal_id_in_buffer_descriptions > 0 )
                temporal_id_poc[j]
        }
        //end of for loop of explicitly signaled long term pictures
        if( number_of_negative_pictures +
            number_of_positive_pictures <
            max_num_ref_frames ) {
            combine_with_reference_flag
            if( combine_with_reference_flag )
                bd_combination_idx
        }
    }
}
```

Examples of descriptions of the parameters in Listing (3) are given as follows. A bd_poc_cycle_update_flag equal to 1 specifies that the poc_cycle_pps[bd_idx][j] of the referenced buffer description should be overridden for the current picture. In some configurations, future frames may also override poc_cycle information. If bd_poc_cycle_update_flag is 0 then the original poc_cycle_pps[bd_idx][j] of the referenced buffer description are to be used. poc_cycle_pps_override[j] specifies the values to be used to override the values within the poc_cycle_pps[bd_idx][j] for the current picture only. In an alternative configuration, poc_cycle_pps_override[j] specifies an offset. For the current picture only, (poc_cycle_pps[bd_idx][j]+poc_cycle_pps_override[j]) may be used instead of poc_cycle_pps[bd_idx][j].

number_of_longterm_pictures specifies the number of long term picture entries in the list POCBD and POC_CYCLE_BD. The value of number_of_longterm_pictures shall be in the range of 0 to max_num_ref_frames, inclusive. max_num_ref_frames specifies the maximum number of short term and long term reference frames. poc[j] specifies POC value and defines the value of the variable POCBD[j] as POCBD[j]=poc[j]. poc[j] shall be in the range of 0 to MaxPOC−1. poc_cycle[j] (e.g., the cycle parameter) specifies poc_cycle value and defines the value of the variable POC_CYCLE_BD as PC_CYCLE_BD[j]=poc_cycle[j]. poc_cycle[j] may be less than or equal to zero or may occupy a different numerical range.

temporal_id_poc[j] specifies a temporal identifier and shall be represented by bits_for_temporal_id_in_buffer_descriptions bits. temporal_id_poc[j] defines the value of the variable TemporalIDBD[j] as TemporalIDBD[j]=temporal_id_poc[j]. temporal_id_poc[i][j] shall be in the range of 0 to max_temporal_layers_minus1, inclusive. max_temporal_layers_minus1+1 specifies the maximum number of temporal layers present in a sequence. In this approach, buffer description B may be omitted from PPS.

In some configurations, number_of_longterm_pictures_pps[bd_idx] may be transmitted before the "for" loop illustrated in Listing (3), thereby avoiding a dependency on a slice header with PPS. Alternatively, bd_poc_cycle_update_flag may be replaced with another parameter, num_longterm_poccycle_override_count. For example, relevant code in Listing (3) above may be replaced with "If num_longterm_poccycle_override_count>0 then For (j=0; j<num_longterm_poccycle_override_count; j++) { . . . }."

A bd_reference_flag equal to 1 specifies that the buffer description of the current picture shall be created using syntax elements not transmitted in the slice header. In one configuration, the buffer description for the current picture is created using syntax elements in the picture parameter set. A buffer_description_reference_flag equal to 0 specifies that the buffer description of the current picture shall be created by a combination of buffer descriptions transmitted in the slice header and buffer descriptions not transmitted in the slice header. In one configuration, the buffer descriptions not transmitted in the slice header are transmitted in the picture parameter set.

bd_idx identifies a buffer description in a set of available buffer descriptions. In one configuration, bd_idx specifies an index in the lists POCBD_pps, DeltaPOCBD_pps, POC_CYCLE_BD_pps, and TemporalIDBD_pps that shall be used for the creation of the buffer description of the current picture.

The values corresponding to deltaPOC referenced pictures in (DeltaPOCBD_pps[bd_idx], TemporalIDBD_pps[bd_idx]) are converted to picture order count (e.g., POC), cycle parameter (e.g., poc_cycle) and temporal identifier and added to the picture buffer description lists POCBD, POC_CYCLE_BD and TemporalIDBD. The values in the lists (POCBD_pps[bd_idx], POC_CYCLE_BD_pps[bd_idx], TemporalIDBD_pps[bd_idx]) corresponding to reference pictures are added to the picture buffer description lists POCBD, POC_CYCLE_BD and TemporalIDBD. In one configuration of the above, the addition operation is an appending operation. In another configuration, the appending (or addition) operation is an operation that replaces items in the list in a predefined order.

Some examples of ways in which the systems and methods described herein may be applied are given hereafter. Assume that a picture with POC=0 on is a long-term (reference) picture used by a picture with POC=MaxPOC−1 and a picture with POC=0 from a subsequent picture set. The long-term (reference) picture may be indicated in different ways.

In a first way, there are two buffer descriptions in the PPS, including buffer description A: {POC=0,poc_cycle=0,temporalID} and buffer description B: {POC=0,poc_cycle=−1, temporalID}. The picture with POC=MaxPOC−1 will point to buffer description A. The picture with POC=0 from the subsequent picture set will refer to buffer description B.

In a second alternative way, the picture with POC=MaxPOC−1 will point to buffer description A. The picture with POC=0 from the subsequent picture set will refer to buffer description A. The buffer description A corresponds to {POC=0, poc_cycle=0, temporalID}. For referencing the correct picture, the poc_cycle should be set to −1, since the referenced picture belongs to the previous [0, . . . , MaxPOC−1] picture set. Thus, the poc_cycle value for buffer description A that is currently set to 0 may be overridden (e.g., set to a different value) for the current slice only, by transmitting a "−1" in the slice header. In some configurations, the first slice in a picture may be used to override the poc_cycle value of a buffer description for the current picture only.

In some configurations, the list of reference pictures signaled at a high level may be modified at a finer level. For example, a list of reference pictures may be signaled in the buffer description transmitted in the PPS (e.g., signaled at high level). However, the buffer description transmitted in the PPS may be modified (e.g., modified at a finer level). For example, the buffer description may be modified by deleting existing entries. Additionally or alternatively, the buffer description information from the PPS may be modified to add new entries or replace an entry. The buffer description information from the PPS may also be modified to add new entries and replace current entries using a predefined mechanism, such as if no empty slots are available. A benefit of allowing modifications is that a higher level of control may be obtained. This may be instead of using the buffer descriptions from the PPS without modification or in addition to or alternatively by replacing only the first 'n' entries.

In some configurations, additional syntax may be defined to replace entries in the slot list. In this case, the index in the list that is replaced and the entry that may replace the current entry at that index will be specified.

Additionally or alternatively, additional syntax may be defined to add entries in the list with replacement if the slot list has no vacancies. In this case, the index in the list that should be replaced may be signaled explicitly (from the encoder 108 or overhead signaling module 112, for example) or inferred implicitly (by the decoder 102, for example) using some information transmitted earlier in the bitstream.

Listing (4) illustrates another example of syntax modification for the PPS from AHG21. In particular, Listing (4) illustrates another example of buffer description syntax used in slice headers as outlined in AHG21. However, modifications to the syntax given in AHG21 in accordance with the systems and methods disclosed herein are denoted in bold text in Listing (4).

Listing (4)

```
/* Buffer description
*/
buffer_description( ) {
    bd_reference_flag
    if(bd_reference_flag == 1) {
        bd_idx
        bd_poc_cycle_update_flag
        if (bd_poc_cycle_update_flag == 1)
            for( j = 0; j < number_of_longterm_pictures_pps[bd_idx];
            j++ ) {
                poc_cycle_pps_override[j]
            }
        bd_poc_cycle_delete_count
        if (bd_poc_cycle_delete_count >0 )
            for( j = 0; j < bd_poc_cycle_delete_count; j++ ) {
                bd_pps_delete_idx[j]
            }
        bd_poc_cycle_append_count
        if (bd_poc_cycle_append_count >0 )
            for( j = 0; j < bd_poc_cycle_append_count; j++ ) {
                poc_pps_append[j]
                poc_cycle_pps_append[j]
            }
```

Listing (4)
-continued

```
    } else {
        number_of_negative_pictures
        for( i = 0; i < number_of_negative_pictures; i++ ) {
            ...
        }
        if( positive_pictures_in_buffer_descriptions_flag ){
            ...
        }
        number_of_longterm_pictures
        for( j = 0; j < number_of_longterm_pictures; j++ ) {
            poc[j]
            poc_cycle[j]
            if( bits_for_temporal_id_in_buffer_descriptions > 0 )
                temporal_id_poc[j]
        }
        if( number_of_negative_pictures +
            number_of_positive_pictures <
            max_num_ref_frames ) {
            combine_with_reference_flag
            if( combine_with_reference_flag )
                bd_combination_idx
        }
    }
}
```

Listing (4) contains many elements similar to that of Listing (3). Listing (4) also contains syntax modifications to the slice header to allow for deletions and/or additions of reference pictures.

Examples of descriptions of the parameters in Listing (4) are given as follows. A bd_poc_cycle_delete_count specifies the number of entries to be deleted from the lists: POCBD_pps[bd_idx] and POC_CYCLE_BD_pps[bd_idx] for the current picture (only, for example). In some configurations, bd_poc_cycle_delete_count may be greater than or equal to 0.

bd_pps_delete_idx[j] specifies that, for the current picture, the POC_CYCLE_BD_pps[bd_idx][bd_pps_delete_idx[j]] entry and the POCBD_pps[bd_idx][bd_pps_delete_idx[j]] entry are deleted in the two lists. In some configurations, once a picture is deleted, it may no longer be available for reference by subsequent decoded pictures. In other configurations, once all the deletions are completed, the remaining entries in the list POCBD_pps[bd_idx] and POC_CYCLE_BD_pps[bd_idx] may be moved towards the initial index (e.g., zero-th index) to occupy the vacated slots. This process may be carried out so no empty slots remain between any two occupied slots. Here, a slot corresponds to an entry in the buffer description. For example, if the list is [Slot0=A] [Slot1=empty] [Slot2=B] [Slot3=C] [Slot4=empty] [Slot 5=D], then after the deletions the entries are moved towards Slot0 until no empty slots remain between any two occupied slots. In this example, the resulting list is [Slot0=A] [Slot1=B] [Slot2=C] [Slot3=D] [Slot4=empty] [Slot 5=empty].

bd_poc_cycle_append_count specifies the number of entries to be appended to lists: POCBD_pps[bd_idx] and POC_CYCLE_BD_pps[bd_idx] for the current picture. In some configurations, bd_poc_cycle_append_count may be greater than or equal to 0.

poc_pps_append[j] specifies the POC value to be appended to the list POCBD_pps[bd_idx] for the current picture (only, for example). In some configurations, if any empty slots exist in the list, additions may be performed starting with the empty slot closest to the zero-index and then in increasing order of slot index.

poc_cycle_pps_append[j] specifies the poc_cycle value to be appended to the list POC_CYCLE_BD_pps[bd_idx] for the current picture (only, for example). In some configurations, if any empty slots exist in the list, then the empty slot closest to the zero-index may be filled first. Additionally, slots may be filled in increasing order of slot index. In some configurations, these operations of overriding entries, deleting entries and appending entries to POCBD_pps[bd_idx] and POC_CYCLE_BD_pps[bd_idx] are carried out in a pre-defined order.

Some examples of configurations of the systems and methods disclosed herein are given hereafter. In one configuration, the 3-tuple (POC, poc_cycle, temporalID) may be replaced with the 2-tuple (LTSlotIdx, temporalID). LTSlotIndex may be a slot index that points to a location in the long-term DPB. One possible benefit of this approach is to reduce bitrate overhead.

In another configuration, the 3-tuple (POC, poc_cycle, temporalID) may be replaced with (f(POC, poc_cycle), temporalID), where f(POC, poc_cycle) is a function (e.g., look-up table) that maps the two-tuple (POC, poc_cycle) to an index.

In some configurations, some or all information typically contained in the PPS and/or in buffer descriptions may be additionally or alternatively carried in an Adaptive Slice Parameter Set or Adaptation Parameter Set (APS). This information includes one or more of: number_of_longterm_pictures, poc[j], poc_cycle[j], temporal_id_poc[j], number_of_longterm_pictures_pps[i], poc_pps[i][j], poc_cycle_pps[i][j] and temporal_id_poc_pps[i][j]. For example, The Adaptive Slice Parameter Set or Adaptation Parameter Set (APS) may include one or more of a number of reference pictures (e.g., number_of_longterm_pictures), a picture order count (e.g., poc[j]), a picture order count cycle parameter (e.g., poc_cycle[j]), a temporal identifier picture order count parameter (e.g., temporal_id_poc[j]), a picture parameter set number of reference pictures (e.g., number_of_longterm_pictures_pps[i]), a picture parameter set picture order count (e.g., poc_pps[i][j]), a picture parameter set picture order count cycle parameter (e.g., poc_cycle_pps[i][j]) and a picture parameter set temporal identifier picture order count parameter (e.g., temporal_id_poc_pps [i][j]).

In some configurations, the information poc_cycle[j] may only be signaled (e.g., from an encoder 108 to the decoder 102, 202) if it is different than 0. In this case, an alternate syntax may be defined.

In an yet another configuration, some or all information typically contained in the PPS and/or in the buffer descriptions may additionally or alternatively be carried in a slice header separately from the buffer description information. For example, the slice header may carry (separately from the buffer description container) one or more of a number of reference pictures (e.g., number_of_longterm_pictures), a picture order count (e.g., poc[j]), a picture order count cycle parameter (e.g., poc_cycle[j]), a temporal identifier picture order count parameter (e.g., temporal_id_poc[j]), a picture parameter set number of reference pictures (e.g., number_of_longterm_pictures_pps[i]), a picture parameter set picture order count (e.g., poc_pps[i][j]), a picture parameter set picture order count cycle parameter (e.g., poc_cycle_pps[i][j]) and a picture parameter set temporal identifier picture order count parameter (e.g., temporal_id_poc_pps[i][j]).

In an alternative configuration, a long term (reference) picture may be signaled by indexing it as x.y, where x=poc[j] or poc_pps[i][j] and y is a new information subindex that defines an additional namespace/numberspace for subindexing long term (reference) pictures. In this case, the x and y entries may be sent in PPS and/or buffer descriptions (in a slice header) for each long term (reference) picture.

In some configurations, all (reference) pictures (e.g., long-term and short-term) are referenced using either delta referencing (using deltaPOC and temporalID, for example) or absolute referencing (using POC, poc_cycle and temporalID, for example). For example, the entire decoded picture buffer (DPB) may contain a set of received pictures. A subset of these received pictures may use delta referencing and the remaining received pictures may use absolute referencing. It should be noted that prior approaches do not specify the same absolute referencing as given in accordance with the systems and methods disclosed herein (using POC and poc_cycle, for example). It should be noted that one or more of the configurations of buffer descriptions and syntaxes described may be implemented in combination with one or more of the methods and/or approaches described herein.

Figure 3:
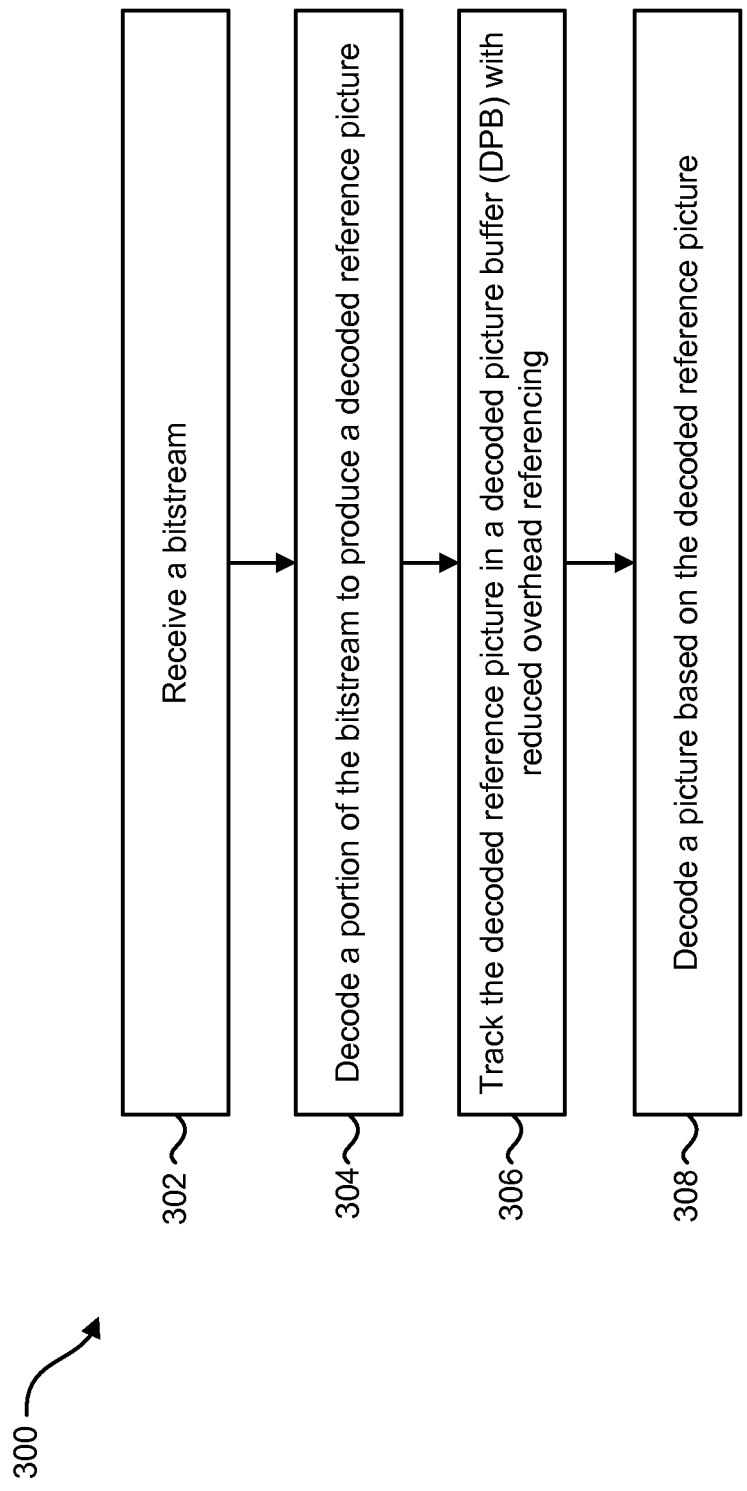
FIG. 3 is a flow diagram illustrating one configuration of a method for tracking a reference picture with reduced overhead referencing based on a designated picture.

FIG. 3 is a flow diagram illustrating one configuration of a method 300 for tracking a reference picture with reduced overhead referencing based on a designated picture. An electronic device 204 (e.g., decoder 202) may receive 302 a bitstream. For example, the decoder 202 may receive 302 a bitstream 214 that includes an encoded reference picture (and other encoded pictures, for instance). In some configurations, the bitstream 214 may also include overhead information (e.g., PPS, buffer description information, parameters, wrap indicators, reference picture designation or identifier, etc.).

The electronic device 204 may decode 304 a portion of the bitstream 214 to produce a decoded reference picture. For example, the decoder 202 may decode 304 a portion of the bitstream 214 to produce a decoded reference picture that is stored in frame memory 264. It should be noted that one or more portions of the bitstream 214 may be decoded 304 to produce one or more decoded reference pictures.

The electronic device 204 may track 306 the decoded reference picture in a decoded picture buffer (DPB) with reduced overhead referencing. For example, the electronic device 204 may associate a cycle parameter with the decoded reference picture and modify (e.g., decrement or increment) the cycle parameter if a wrap indicator is received or if a transition between picture sets is determined. Other approaches may be used for tracking 306 the decoded reference picture. Greater detail is given below. It should be noted that the DPB may include one or more decoded reference pictures.

The electronic device 204 may decode 308 the picture based on one or more decoded reference pictures. For example, a portion of the bitstream 214 (other than the portion decoded 304 to produce the decoded reference picture) may be decoded 308 based on the reference picture. For instance, the decoded reference picture (that has been tracked in the DPB) may be provided to a motion compensation module 260 in order to generate an inter-frame prediction signal 268 based on an inter-frame prediction mechanism. The inter-frame prediction signal 268 may then be used to decode 308 the picture. In some configurations or instances, one or more decoded reference pictures may be tracked 306 and used to decode 308 the picture.

Figure 4:
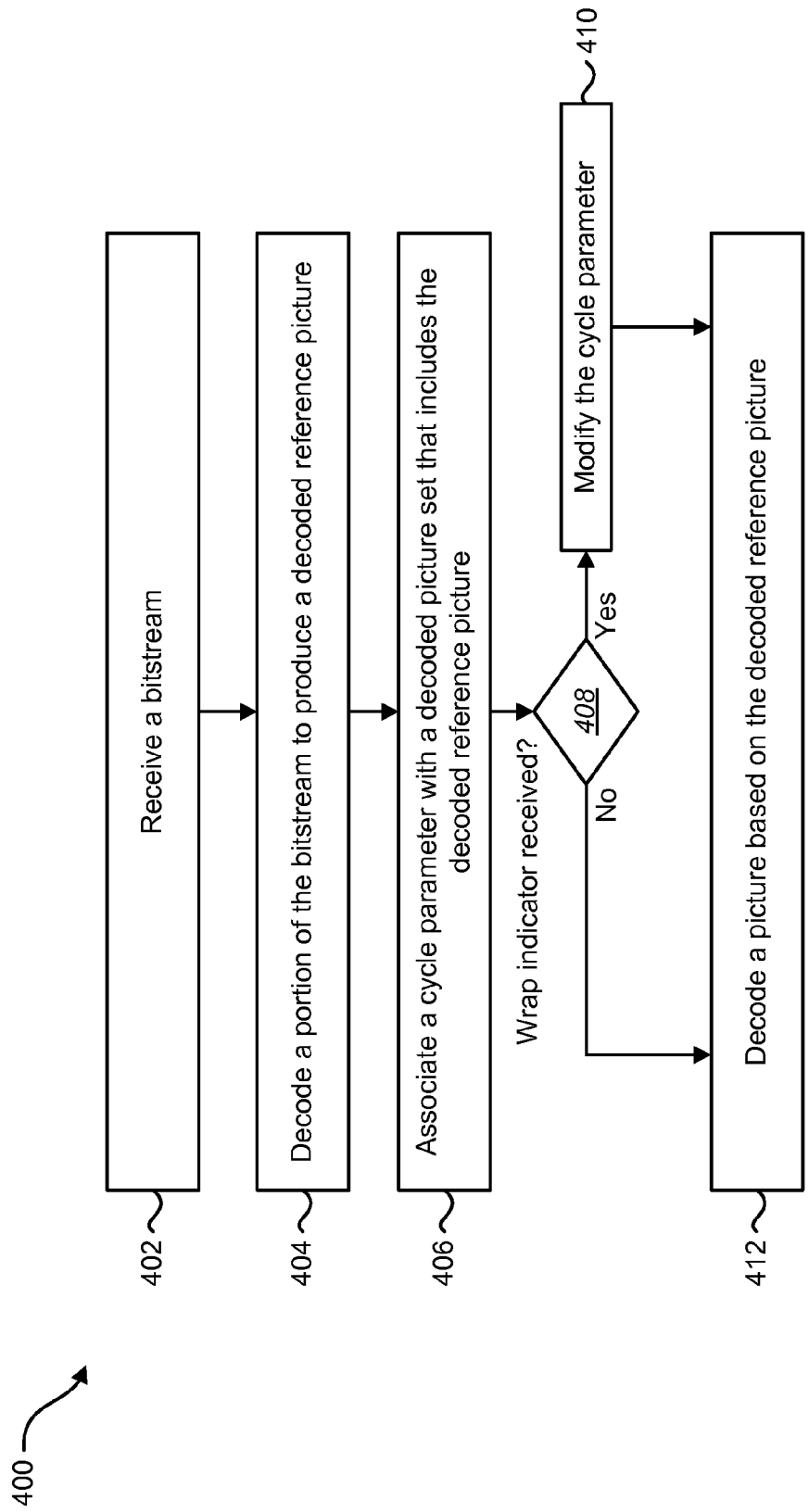
FIG. 4 is a flow diagram illustrating a more specific configuration of a method for tracking a reference picture with reduced overhead referencing based on a designated picture.

FIG. 4 is a flow diagram illustrating a more specific configuration of a method 400 for tracking a reference picture with reduced overhead referencing based on a designated picture. This method 400 may be one approach for tracking which picture is being referenced when POCs are reused. An electronic device 204 (e.g., decoder 202) may receive 402 a bitstream 214. For example, the decoder 202 may receive 402 a bitstream 214 that includes an encoded reference picture (and other encoded pictures, for instance). In some configurations, the bitstream 214 may include overhead information (e.g., PPS, buffer description information, parameters, wrap indicators, reference picture designation or identifier, etc.).

The electronic device 204 may decode 404 a portion of the bitstream 214 to produce a decoded reference picture. For example, the decoder 202 may decode 404 a portion of the bitstream 214 to produce a decoded reference picture that is stored in frame memory 264. It should be noted that one or more portions of the bitstream 214 may be decoded 404 to produce one or more decoded reference pictures.

The electronic device 204 may associate 406 a cycle parameter with a decoded picture set that includes the decoded reference picture. For example, the electronic device 204 may associate 406 a cycle parameter "poc_cycle" with a decoded picture set that includes the decoded reference picture.

The cycle parameter "poc_cycle" may be defined as follows. When a fixed number of bits are used to represent the POC of a picture in a range [0, . . . , MaxPOC−1], MaxPOC unique integer values exist. If the number of pictures being encoded exceeds MaxPOC, a picture numbering mechanism must reuse already assigned POC values. The POC numbering then progresses as follows in one example: . . . , [0, . . . , MaxPOC−1]$_{n-2}$, [0, . . . , MaxPOC−1]$_{n-1}$, [0, . . . , MaxPOC−1]$_n$, [0, . . . , MaxPOC−1]$_{n+1}$, . . . . The subscript in this example denotes the number of times the set [0, . . . , MaxPOC−1] has been repeated. This subscript or the number of times the set [0, . . . , MaxPOC−1] has been repeated may be denoted as MaxPOCSetIndex. For example, a picture with POC=0 and MaxPOCSetIndex=n represents the (n*MaxPOC+1)$^{th}$ picture of the sequence (with an assumption that picture set numbering starts with 1, for instance). Additional detail regarding the cycle parameter "poc_cycle" is given in connection with FIG. 5 below.

The electronic device 204 may determine 408 whether a wrap indicator is received. For example, each time an encoder 108 or transmitting electronic device A 104a reaches a predetermined maximum number of pictures in a set of pictures, the encoder 108 or transmitting electronic device A 104a may send a wrap indicator that is received by the decoder 102 or receiving electronic device B 104b to indicate that another set of pictures is being sent (e.g., a POC is resetting or starting another cycle). Greater detail is given in connection with FIG. 11 below.

If the electronic device 204 determines 408 that a wrap indicator was received, the electronic device 204 may modify 410 (e.g., decrement) the cycle parameter. For example, the electronic device 204 decrements cycle parameters for each picture or each set of pictures in the DPB. In another example, the electronic device 204 may increment the cycle parameter.

The electronic device 204 may decode 412 a picture based on the decoded reference picture. For example, a portion of the bitstream 214 (other than the portion decoded 404 to produce the decoded reference picture) may be decoded 412 based on the reference picture. For instance, the decoded reference picture (that has been tracked in the DPB) may be provided to a motion compensation module 260 in order to generate an inter-frame prediction signal 268 based on an inter-frame prediction mechanism. The inter-frame prediction signal 268 may then be used to decode 412 the picture. In some configurations or instances, one or more decoded reference pictures may be used to decode 412 the picture.

Figure 5:
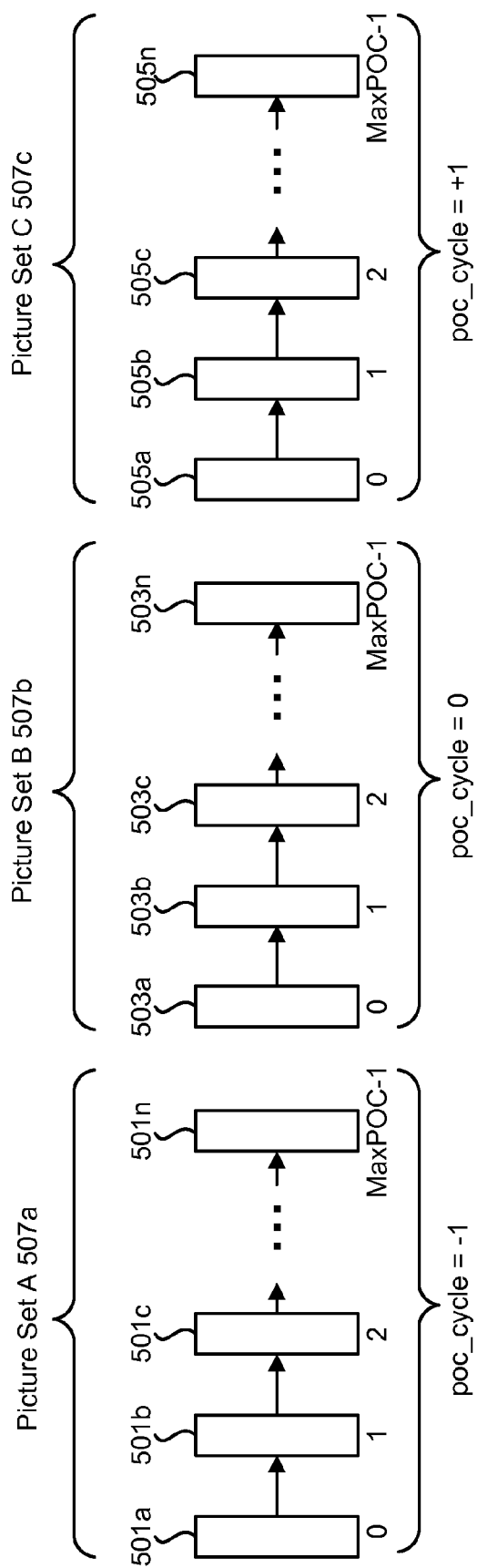
FIG. 5 is a diagram illustrating one example of multiple picture sets referenced by cycle parameters.

FIG. 5 is a diagram illustrating one example of multiple picture sets referenced by cycle parameters. More specifically, FIG. 5 illustrates an example of tracking a reference picture with reduced overhead referencing based on a designated picture using a cycle parameter. In particular, FIG. 5 illustrates a cycle parameter (e.g., poc_cycle=−1) associated with picture set A 507a, a cycle parameter (e.g., poc_cycle=0) associated with picture set B 507b and a cycle parameter (e.g., poc_cycle=+1) associated with picture set C 507c. However, it should be noted that picture set A 507a may or may not be the first picture set in a sequence of frames. For example, one or more picture sets may precede picture set A 507a. Furthermore, it should be noted that picture set C 507c may or may not be the last picture set in a sequence of frames. For example, one or more picture sets may follow picture set C 507c.

Each picture set 507a-c may include one or more pictures 501a-n, 503a-n, 505a-n. In this example, each picture set 507a-c includes MaxPOC pictures 501, 503, 505. In particular, each picture 501, 503, 505 may have a corresponding picture order count (POC), denoted as [0, 1, 2, . . . , MaxPOC−1] in FIG. 5.

In one example, the poc_cycle of the picture set that contains the current decoded picture may be set to 0 for computing the poc_cycle of other pictures. In some cases, pictures may be decoded out of order. For example, a decoder may see 503b, then 505a and then 503c. In this example, assume that a picture being currently decoded is a picture 503b in picture set B 507b with POC=1. The poc_cycle of another picture, such as a reference picture, may then be calculated based on the poc_cycle of the current decoded picture.

Figure 6:
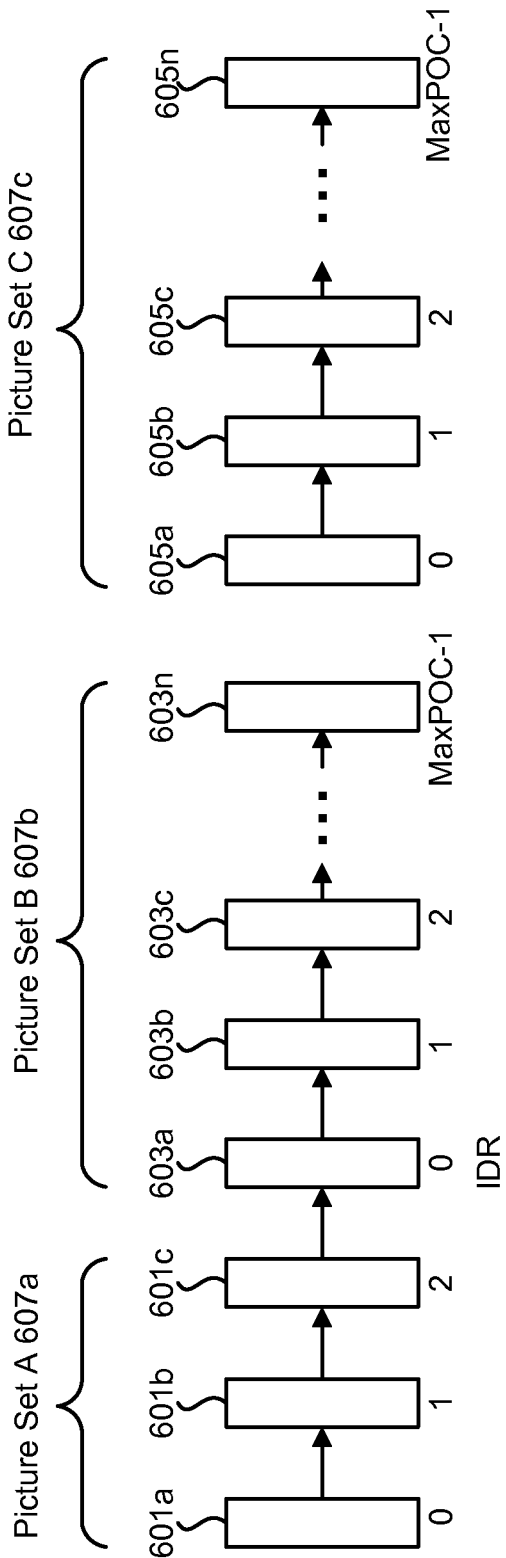
FIG. 6 is a diagram illustrating another example of multiple picture sets.

FIG. 6 is a diagram illustrating another example of multiple picture sets. FIG. 6 contains picture sets 607a-c similar to the picture sets 507a-c described above in connection with FIG. 5. One or more pictures 601a-c, 603a-n, 605a-n may be included in each picture set 607a-c. A picture set 607a-c may include MaxPOC pictures. Further, each picture 601a-c, 603a-603n, 605a-605n may have a corresponding picture order count (POC), belonging to the set [0, 1, 2, . . . , MaxPOC−1] as denoted in FIG. 6.

A picture set 607 may include one or more pictures. For example, pictures 603a-n in picture set B 607b may be grouped as a picture set. Likewise, pictures 605a-n in picture set C 607c may be grouped together into a picture set. A picture set may include pictures that are adjacent to each other when encoded or may consist of random pictures grouped together. In another example, a picture set may make up a poc_cycle consisting of [0, 1, 2, . . . , MaxPOC−1] pictures.

In some configurations, a picture set 607a may include an instantaneous decoding refresh (IDR) picture 603a (e.g., IDR access unit). The IDR picture 603a may be signaled by the encoder in the bitstream. Additionally or alternatively, the IDR may be identified based on picture type. In some configurations, the IDR picture 603a may indicate to the decoder 202 that no subsequent pictures in the bitstream 214 will require reference to prior pictures in the bitstream 214.

When an IDR picture 603a is decoded by a decoder 202, the POC may be reset back to a predetermined value. For example, after decoding picture set A 607a, an IDR picture 603a is received or signaled. At this point, the POC may be reset back to 0 and a new picture set, picture set B 607b, begins. In other words, the IDR picture 603a may specify the reference picture relative to a designated picture. One benefit of sending an IDR picture 603a may be to introduce a new reference picture. This benefit will be described in greater detail below in connection with FIG. 7.

Figure 7:
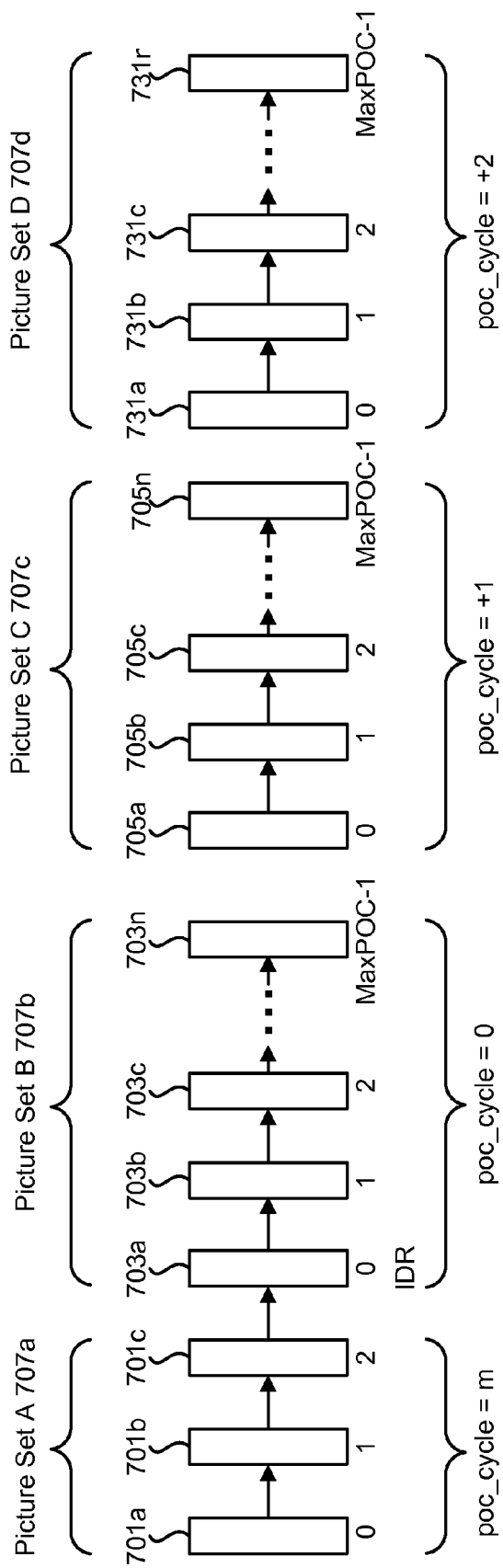
FIG. 7 is a diagram of a more specific example of multiple picture sets referenced by cycle parameters.

FIG. 7 is a diagram of a more specific example of multiple picture sets referenced by cycle parameters. FIG. 7 illustrates picture sets 707a-d and pictures 701, 703, 705 along with their associated POC and poc_cycle similar to components 507a-c, 501, 503, 505, described above in connection with FIG. 5. Additionally, FIG. 7 shows an addition picture set 707*d* along with associated pictures 731*a-n*.

FIG. 7 also illustrates a designated picture 703*a*. In one configuration, the cycle parameter (e.g., poc_cycle) for the designated picture may be set to 0. For example, when the first picture in a picture set (e.g., POC=0) is a designated picture (e.g., IDR picture), then the poc_cycle for the designated picture may be equal to 0. The cycle parameter (e.g., poc_cycle) of later picture sets may be calculated with respect to the picture set with the cycle parameter set to 0 (e.g., poc_cycle=0).

One example of a designated picture is an IDR picture 703*a* (e.g., IDR access unit) similar to the IDR picture 603*a* described above in connection with FIG. 6. For convenience, the designated picture 703*a* will be described as an IDR picture. However, it should be noted that the designated picture 703*a* may be any picture that is indicated by the encoder with signaling in the bitstream or that may be implicitly determined by the decoder.

In some configurations, an encoder may send a signal in the bitstream that indicates the IDR picture 703*a*. The value of the POC counter may be determined based on this signal. For example, the signal may indicate (to the decoder) to set the POC to 0 for the IDR picture (if the POC is not 0 for the IDR picture, for example). For instance, the IDR picture 703*a* may cause a decoder to reset the POC counter to the initial value, 0 for instance. The poc_cycle may also be based on the IDR picture 703*a*. Similar to the POC, the signal may indicate that the poc_cycle should be reset to the initial value. In another example, the signal may indicate that no modification to the POC or the poc_cycle need occur (if they are at the initial value for the IDR picture 703*a*).

The IDR picture 703*a* may be an indication to set or reset the POC and poc_cycle (and/or other cycle parameters, for example), which may be used to track a reference picture relative to the designated picture 703*a*. For example, the decoder 202 may decode pictures 701*a-c* in set A 707*a*. Picture set A 707*a* may have the cycle parameter poc_cycle=m associated with it. An IDR picture 703*a* may then be signaled from the bitstream 214. The IDR picture 703*a* may indicate a new cycle parameter (e.g., poc_cycle=0) and may indicate a POC=0. Picture sets 707*b-d* may then be decoded and their associated cycle parameter may increment from the initial value (e.g., poc_cycle=0, poc_cycle=+1, poc_cycle=+2, respectively). In this example, later picture sets 707*b-d* are calculated with respect to the newly set cycle parameter and POC.

As described previously, an IDR picture 703*a* may indicate to the decoder 202 that no subsequent pictures in the bitstream will require reference to pictures prior pictures in the bitstream 214. However, an IDR picture 703*a* may just signal a reset of the POC or of the cycle parameters. For example, picture set A may have a cycle parameter of poc_cycle=m where m=+5. When the IDR picture 703*a* is received, m may be changed to be m=-1. Thus, the IDR picture 703*a* may make the poc_cycle count of the reference picture relative to a designated picture. In other words, the IDR picture 703*a* may signal the poc_cycle count to calculate the reference picture relative to a designated picture in the sequence, not just the current picture.

Figure 8:
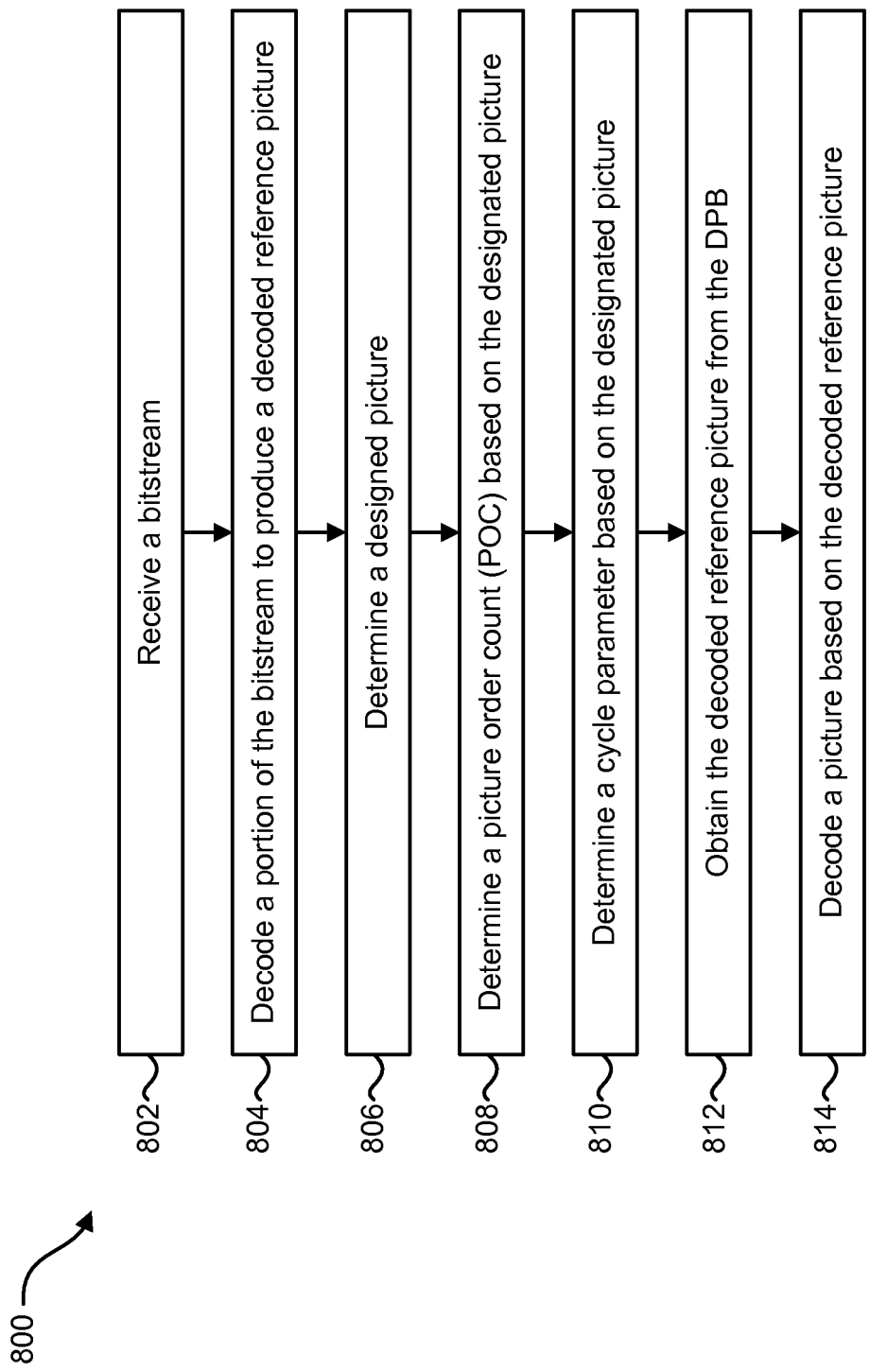
FIG. 8 is a flow diagram illustrating one configuration of a method for tracking a reference picture with reduced overhead referencing based on a designated picture.

FIG. 8 is a flow diagram illustrating one configuration of a method 800 for tracking a reference picture with reduced overhead referencing based on a designated picture. An electronic device 204 (e.g., decoder 202) may receive 802 a bitstream and decode 804 a portion of the bitstream 214 to produce a decoded reference picture. This may occur in a similar manner as described previously in connection to FIG. 3.

The electronic device 204 may track the decoded reference picture in a decoded picture buffer (DPB) with reduced overhead referencing based on a designated picture. This may be accomplished as follows. The electronic device 204 (e.g., decoder 202) may determine 806 a designated picture. In one configuration, the electronic device 204 may make this determination 806 based on explicit signaling received in the bitstream 214. For instance, the bitstream 214 may include an indicator that specifies the designated picture. In one example, the designated picture may be an instantaneous decoding refresh (IDR) picture that is indicated by signaling (e.g., in a picture parameter set (PPS), in a buffer description, etc.) received in the bitstream 214.

The electronic device 204 may determine 808 a picture order count (POC) based on the designated picture. For example, the electronic device 204 may set or reset the POC associated with the designated picture. For instance, the POC associated with the designated picture may be set to 0. Accordingly, the electronic device 204 may reset a POC sequence based on the designated picture. For example, the POCs for other pictures may be numbered based on the POC associated with the designated picture 603*a* as illustrated in FIG. 6.

The electronic device 204 may determine 810 a cycle parameter (e.g., poc_cycle) based on the designated picture. For example, the cycle parameter associated with a picture set that includes the designated picture may be set or reset to 0. The cycle parameters for other picture sets may be determined (e.g., calculated) based on the picture set including the designated picture (e.g., IDR picture). One example of this is illustrated in and described in connection with FIG. 7.

When the POCs and cycle parameters (e.g., poc_cycles) are determined based on the designated picture, the POC and cycle parameter of the decoded reference picture may be updated as necessary. This may enable tracking of the decoded reference picture in the decoded picture buffer (DPB). Thus, the decoded reference picture may be tracked based on the designated picture (e.g., IDR picture).

The electronic device 204 may obtain 812 a decoded reference picture from the DPB. For example, the electronic device 204 may retrieve the decoded reference picture from the DPB according to a POC and cycle parameter (e.g., poc_cycle) that are based on the designated picture.

The electronic device 204 may decode 814 a picture based on the decoded reference picture. This may occur as similarly described above in connection with FIG. 3. It should be noted that a set of one or more decoded reference pictures may be tracked in accordance with the method 800.

Figure 9:
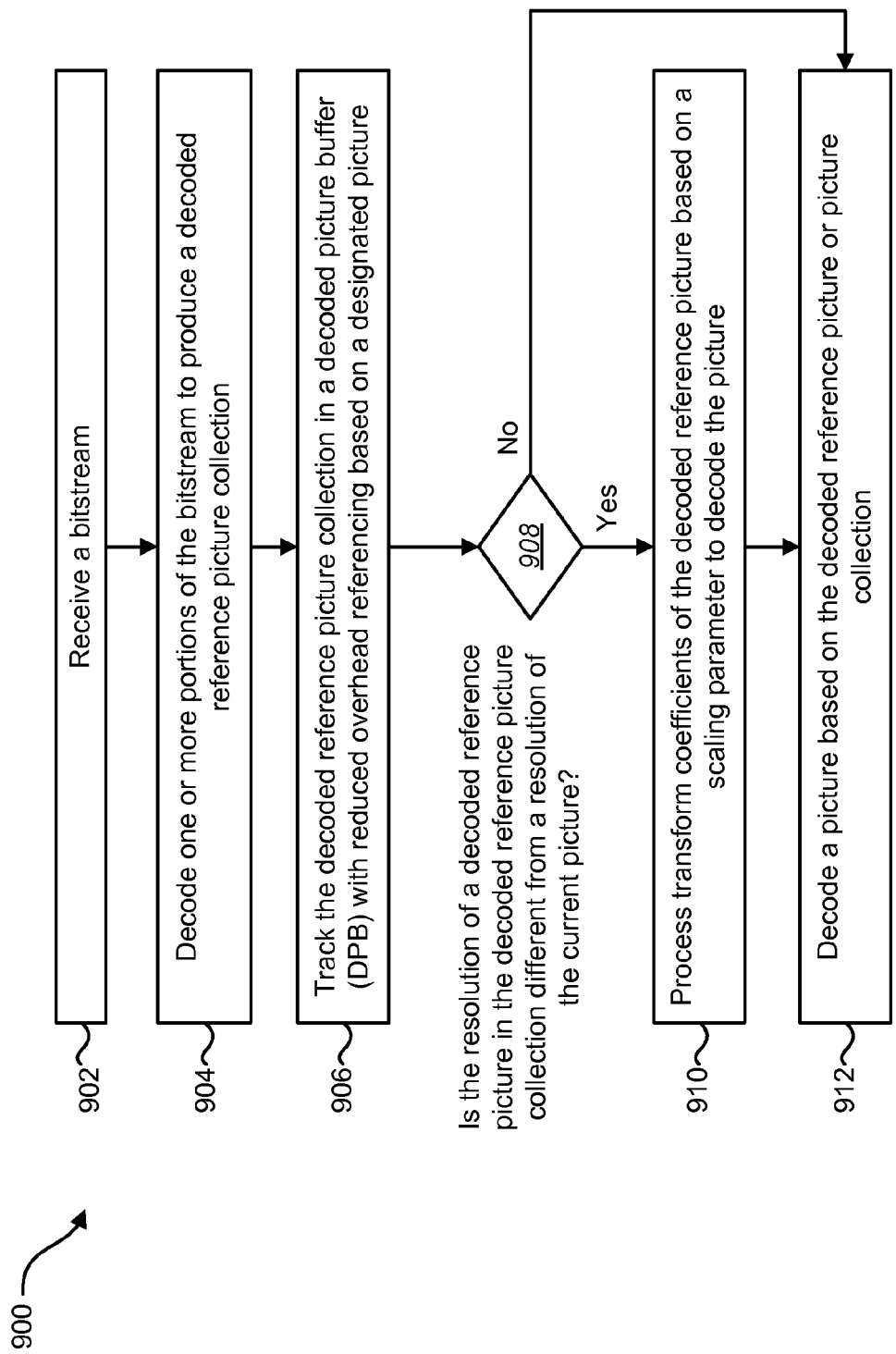
FIG. 9 is a flow diagram illustrating another configuration of a method for tracking a reference picture with reduced overhead referencing based on a designated picture.

FIG. 9 is a flow diagram illustrating another configuration of a method 900 for tracking a reference picture with reduced overhead referencing based on a designated picture. As described preciously, an electronic device 204 may receive 902 a bitstream. The electronic device 204 may also decode 904 one or more portions of the bitstream to produce a reference picture collection. The decoded reference picture collection may include one or more decoded reference pictures.

The electronic device 204 may track 906 the decoded reference picture collection in a decoded picture buffer (DPB) with reduced overhead referencing based on a designated picture. This may be done as described above in connection with FIG. 8. Two or more decoded reference pictures in the decoded reference picture collection may refer to the same or different time instances (e.g., similar time instances) as described above.

The electronic device 204 may optionally determine 908 whether the resolution of a decoded reference picture (for decoding the picture) in the decoded reference picture collection is different from a resolution of the current picture. If the resolution between the two pictures is different, then the electronic device 204 may process 910 the transform coefficients of the decoded reference picture based on a scaling parameter to decode the picture. A more detailed description regarding the scaling parameter and resolution switching is given above in connection with Table (2). It should be noted that the scaling parameter may be determined by receiving the scaling parameter explicitly or by determining the scaling parameter implicitly (using a look-up table, picture resolution characteristics, etc., for example).

Regardless of whether the resolutions are the same or different, the electronic device 204 may decode 912 a picture based on the decoded reference picture collection (e.g., a decoded reference picture in the decoded reference picture collection).

Figure 10:
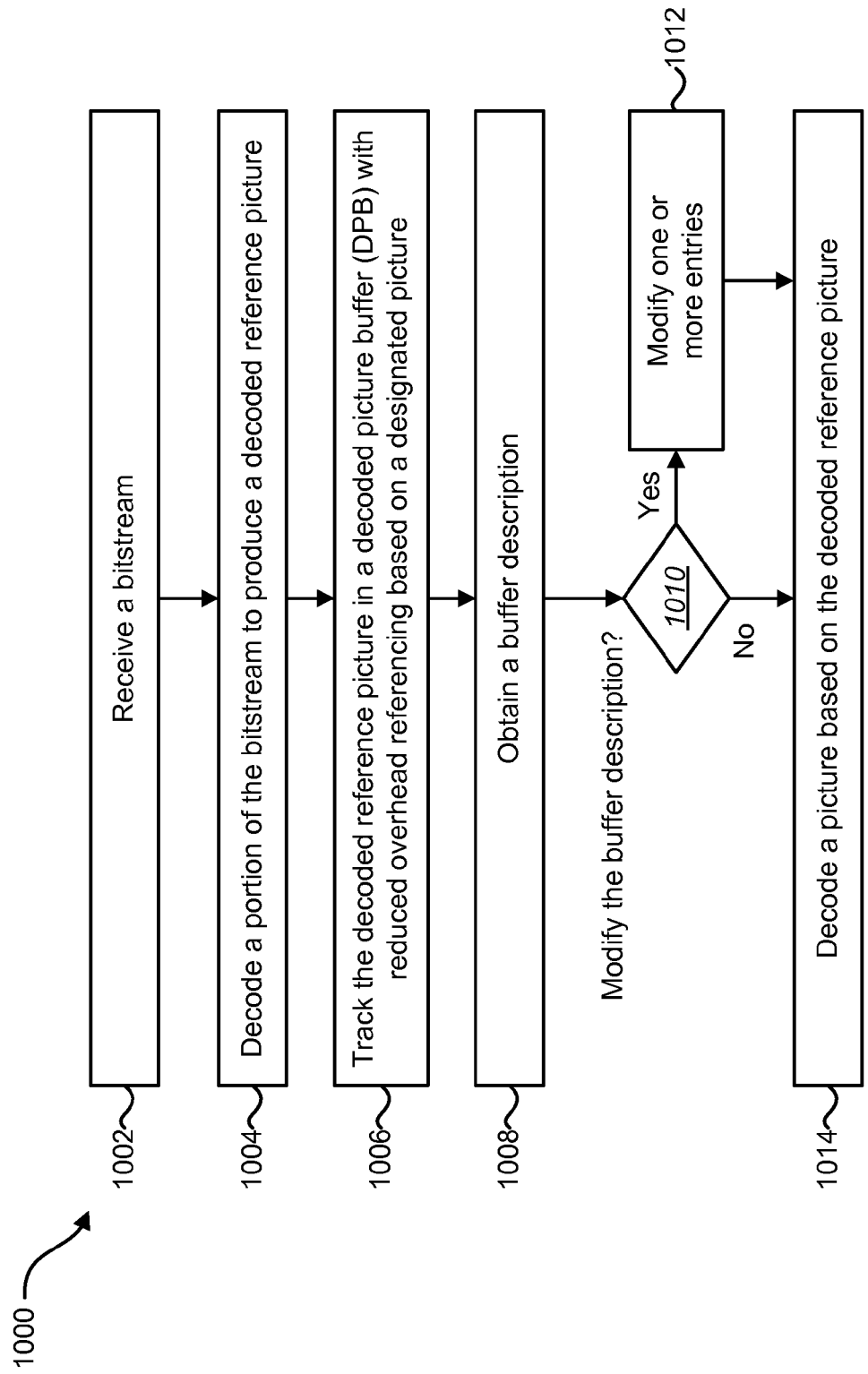
FIG. 10 is a flow diagram illustrating another configuration of a method for tracking a reference picture with reduced overhead referencing based on a designated picture.

FIG. 10 is a flow diagram illustrating another configuration of a method 1000 for tracking a reference picture with reduced overhead referencing based on a designated picture. An electronic device 204 may receive 1002 a bitstream and decode 1004 a portion of the bitstream to produce a decoded reference picture. The electronic device 204 may track 1006 the decoded reference picture in a decoded picture buffer (DPB) with reduced overhead referencing based on a designated picture. This may be done as described above.

The electronic device 204 may also obtain 1008 a buffer description. Some examples of buffer descriptions are described in detail above. For instance, Table (1) and Table (2) above contain examples of various buffer descriptions. The buffer descriptions may be received by a decoder as part of the parameter picture set (PPS) from an encoder. An index to the appropriate buffer descriptions may also be received by a decoder as a part of a slice header. Once the buffer description is obtained 1008, the electronic device 204 may determine 1010 whether to modify the buffer description. If the buffer description requires no modification, then the electronic device 204 may decode 1014 a picture based on the decoded reference picture. However, if the buffer description requires modification, then the electronic device 204 may modify 1012 one or more entries. Examples of modifying 1012 may include deleting an entry, adding an entry or replacing an entry. A more detailed description of deleting, adding or replacing entries may be found above in connection with the description of Listing (4). Once a modification 1012 is complete, the electronic device 204 may decode 1014 a picture based on the decoded reference picture.

Figure 11:
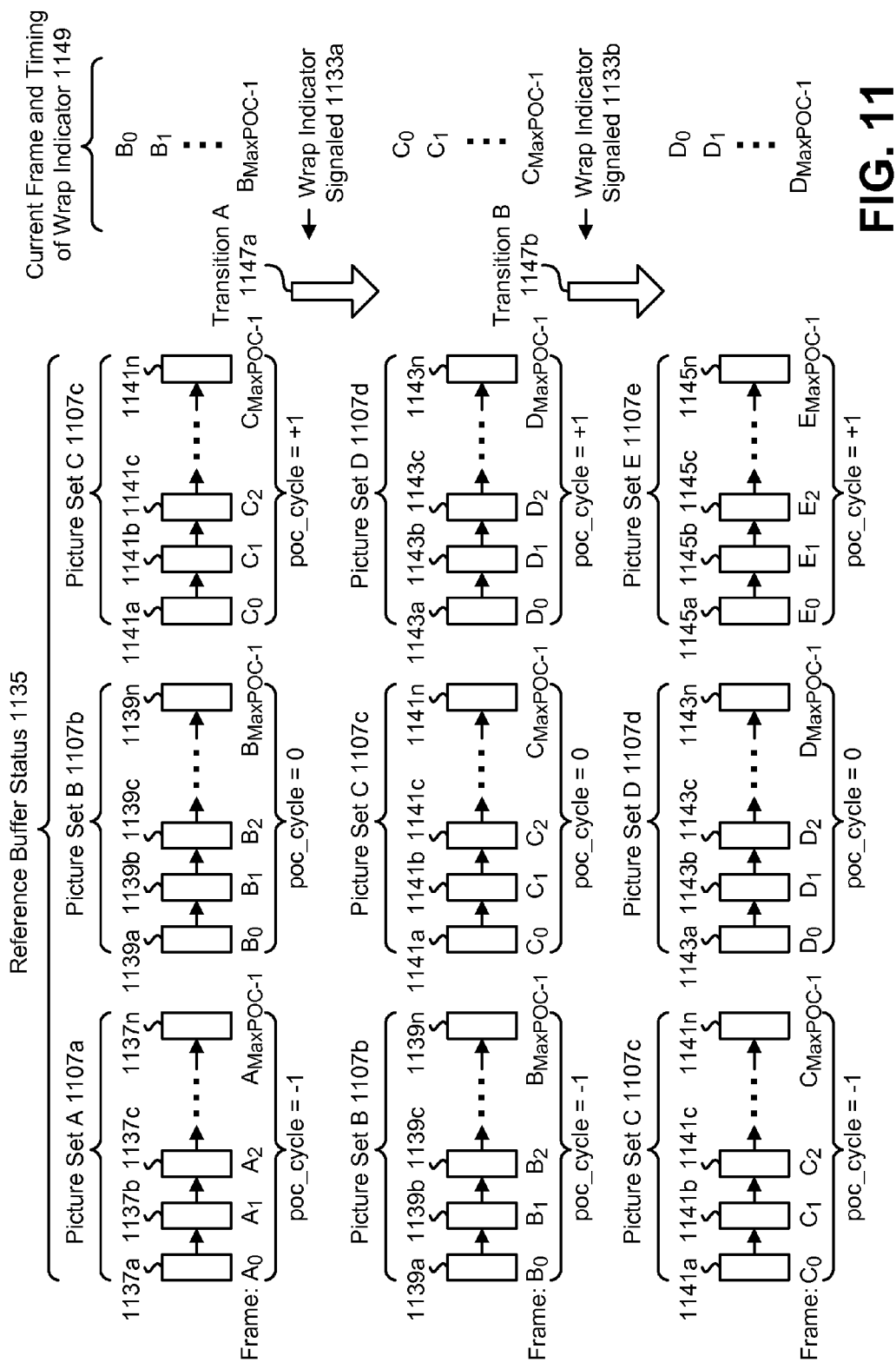
FIG. 11 is a diagram illustrating one example of signaling a wrap indicator in accordance with the systems and methods disclosed herein.

FIG. 11 is a diagram illustrating one example of signaling a wrap indicator 1133 in accordance with the systems and methods disclosed herein. In this example, several pictures 1137a-n, 1139a-n, 1141a-n, 1143a-n, 1145a-n and picture sets 1107a-e are illustrated. In particular, FIG. 11 illustrates a reference buffer status 1135 over time, along with corresponding current frames and the timing of the wrap indicator 1149.

In this example, assume that a picture $B_0$ 1139a in picture set B 1107b with poc_cycle=0 is the current picture or frame at a first time. When transition A 1147a occurs, a wrap indicator is signaled 1133a. At a second time, a picture $C_0$ 1141a in picture set C 1107c is the current picture or frame. Assume that picture $C_0$ 1141a is a reference picture for all subsequent pictures (e.g., in picture set D 1107d and picture set E 1107e). For instance, picture $C_0$ 1141a may be a long term reference picture to be kept in the DPB for decoding subsequent pictures 1141b-n, 1143a-n, 1145a-n. When transition B 1147b occurs, another wrap indicator is signaled 1133b. As illustrated, the poc_cycle parameters are updated upon the signaling 1133 of the wrap indicators. This procedure may be used to track a reference picture in accordance with the systems and methods disclosed herein. Furthermore, it should be noted that the POC and poc_cycle may be reset or restarted based on a decoded reference picture as described herein.

As illustrated in FIG. 11, POC numbers 0 through MaxPOC−1 repeatedly correspond to the pictures 1137a-n, 1139a-n, 1141a-n, 1143a-n, 1145a-n. As described above, each picture set 1107a-e (with POC numbers 0 through MaxPOC−1) may correspond to a cycle parameter (e.g., poc_cycle).

In one configuration, a wrap indicator may be signaled 1133a at the first transition 1147a between a current picture set (e.g., picture set B 1107b) and a subsequent later picture set (e.g., picture set C 1107c). For example, the first time the POC numbering transitions from one [0, . . . , MaxPOC−1] set to the next, the wrap indicator may be signaled 1133. In some configurations, the wrap indicator may be signaled 1133 when POC numbering transitions from one [0, . . . , MaxPOC−1] set to another. Alternatively, the wrap indicator may be signaled 1133 the first time the poc_cycle numbering transitions for the next [0, . . . , MaxPOC−1] picture set. In some configurations, the wrap indicator may be signaled 1133 when poc_cycle numbering transitions for the next [0, . . . , MaxPOC−1] picture set. In some configurations, the wrap indicator signaled may be a protected message denoted "poc_wraparound." As used herein, "signaled" may mean communicated between an encoder and a decoder. In some configurations, "signaled" may also mean communicated between different electronic devices.

A protected message may be a message that must be received by the electronic device 204 in order to maintain a desired functionality such as detection of lost pictures. One mechanism to transmit a message as a protected message is to assign a higher priority to the protected message when compared to other information messages. An intelligent device (e.g., a network congestion control agent) may then examine this priority assignment and drop lower priority messages to meet constraints such as available network bandwidth.

In some configurations, the wrap indicator (e.g., poc_wraparound) message may be signaled in the Picture Parameter Set (PPS), Slice Header, Adaptation Parameter Set (APS) or any suitable location in the bitstream. Additionally or alternatively, the wrap indicator may be signaled out-of-band (e.g., separate from the picture bitstream). Each time the wrap indicator (e.g., poc_wraparound message) is received by the decoder 102, the cycle parameter (e.g., poc_cycle) for every picture (e.g., every picture set) in the DPB may be decremented (by 1, for example).

Listing (5) below illustrates an example of a bitstream syntax modification required to signal the wrap indicator in the picture parameter set:

Listing (5)

```
/* Picture parameter set RBSP syntax
*/
pic_parameter_set_rbsp( ) {
    seq_parameter_set_id
    pic_parameter_set_id
    entropy_coding_mode_flag
    wrap_indicator_flag
    bits_for_temporal_id_in_buffer_descriptions
    positive_pictures_in_buffer_descriptions_flag
    number_of_bds
```

Listing (5) -continued

```
if( number_of_bds > 0 ) {
    for(i = 0; i < number_of_bds; i++){
        number_of_negative_pictures_pps[i]
        for(j = 0; j < number_of_negative_pictures_pps[i]; j++ ) {
            negative_delta_poc_minus_one_pps[i][j]
            if( bits_for_temporal_id_in_buffer_descriptions > 0 )
                temporal_id_negative_pps[i][j]
        }
        if(positive_pictures_in_buffer_descriptions_flag ){
            number_of_positive_pictures_pps[i]
            for( j = 0; j < number_of_positive_pictures_pps[i];
                j++ ) {
                delta_poc_minus_one_pps[i][j]
                if( bits_for_temporal_id_in_buffer_descriptions >
                    0 )
                    temporal_id_positive_pps[i][j]
            }
        }
        number_of_longterm_pictures_pps[i]
        for( j = 0; j < number_of_longterm_pictures_pps[i]; j++ ) {
            poc_pps[i][j]
            poc_cycle_pps[i][j]
            if( bits_for_temporal_id_in_buffer_descriptions > 0 )
                temporal_id_poc_pps[i][j]
        }
    }
}
num_temporal_layer_switching_point_flags
for( i = 0; i < num_temporal_layer_switching_point_flags; i++ )
    temporal_layer_switching_point_flag[i]
num_ref_idx_10_default_active_minus1
num_ref_idx_11_default_active_minus1
pic_init_qp_minus26 /* relative to 26 */
constrained_intra_pred_flag
slice_granularity
shared_pps_info_enabled_flag
if( shared_pps_info_enabled_flag )
    if( adaptive_loop_filter_enabled_flag )
        alf_param( )
if( cu_qp_delta_enabled_flag )
    max_cu_qp_delta_depth
rbsp_trailing_bits( )
}
```

A wrap_indicator_flag equal to 1 specifies that the POC numbering has transitioned the first time from one [0, . . . , MaxPOC−1] picture set to next. A wrap_indicator_flag equal to 0 specifies otherwise. In some configurations, the wrap_indicator_flag equal to 1 specifies that the POC numbering transitions from one [0, . . . , MaxPOC−1] picture set to another. A wrap_indicator_flag equal to 0 specifies otherwise.

In some configurations, a wrap_indicator_flag equal to 1 specifies that the poc_cycle has transitioned the first time for the next [0, . . . , MaxPOC−1] picture set. A wrap_indicator_flag equal to 0 specifies otherwise.

In some configurations, a wrap_indicator_flag equal to 1 specifies that the poc_cycle has transitioned from one [0, . . . , MaxPOC−1] picture set to another. A wrap_indicator_flag equal to 0 specifies otherwise.

In some configurations, the wrap_indicator_flag may use more than one bit to identify additional information, for example, a direction of transition. In another configuration, the wrap_indicator_flag may be signaled as an unsigned integer that is variable length coded using entropy coding. In another configuration, the wrap_indicator_flag is a signed integer that is variable length coded using entropy coding.

seq_parameter_set_id identifies the sequence parameter set that is referred to by the picture parameter set. The value of seq_parameter_set_id shall be in the range of 0 to 31, inclusive.

pic_parameter_set_id identifies the picture parameter set that is referred to in the slice header. The value of pic_param-eter_set_id shall be in the range of 0 to 255, inclusive. entropy_coding_mode_flag selects the entropy decoding method to be applied for the syntax elements.

num_temporal_layer_switching_point_flags specifies how many temporal switching point flags are present. If temporal_id_nesting_flag is equal to 1, num_temporal_layer_switching_point_flags shall be equal to 0. temporal_layer_switching_point_flag[i] specifies if the current access point is a temporal switching point that allows decoding of higher temporal id layers following this access unit. If temporal_id_nesting_flag is equal to 1, temporal_layer_switching_point_flag[i] shall be inferred to be equal to 1. If temporal_id_nesting_flag is equal to 0 and num_temporal_layer_switching_point_flags is less than i, temporal_layer_switching_point_flag[i] shall be inferred to be equal to 0. It should be noted that when starting to decode a higher temporal layer i, the availability of required reference pictures can be guaranteed immediately following an IDR, or a picture with the temporal_id value j lower than i and temporal_switching_flag[j] equal to 1.

num_ref_idx_I0_default_active_minus1 specifies how num_ref_idx_I0_active_minus1 is inferred for P and B slices with num_ref_idx_active_override_flag equal to 0. The value of num_ref_idx_I0_default_active_minus1 shall be in the range of 0 to 31, inclusive.

num_ref_idx_I1_default_active_minus1 specifies how num_ref_idx_I1_active_minus1 is inferred for B slices with the num_ref_idx_active_override_flag equal to 0. The value of num_ref_idx_I1_default_active_minus1 shall be in the range of 0 to 31, inclusive.

pic_init_qp_minus26 specifies the initial value minus 26 of SliceQPY for each slice. The initial value is modified at the slice layer when a non-zero value of slice_qp_delta is decoded, and is modified further when a non-zero value of cu_qp_delta is decoded at the coding unit layer. The value of pic_init_qp_minus26 shall be in the range of −(26+QpBdOffsetY) to +25, inclusive.

A constrained_intra_pred_flag equal to 0 specifies that intra prediction allows usage of residual data and decoded samples of neighboring macroblocks coded using inter macroblock prediction modes for the prediction of macroblocks coded using intra macroblock prediction modes. A constrained_intra_pred_flag equal to 1 specifies constrained intra prediction, in which case prediction of macroblocks coded using intra macroblock prediction modes only uses residual data and decoded samples from 1 macroblock types.

slice_granularity indicates the slice granularity within a picture. The value of slice_granularity shall not be larger than Min(Log 2MaxCUSize−4, log 2_diff_max_min_coding_block_size). The variable SliceGranularity is set to the value of (slice_granularity<<1).

shared_pps_info_enabled_flag specifies that the shared information in the picture parameter set RBSP shall be used for the referred slices. If shared_pps_info_enabled_flag is equal to 1, the alf_param( ) in the picture parameter set RBSP shall be applied for the referred slices. Otherwise, the alf_param( ) in slice header(s) shall be applied.

max_cu_qp_delta_depth specifies the maximum allowed depth that is used for specifying QPY values for a coding unit. The value of max_cu_qp_delta_depth shall be in the range of 0 to 15, inclusive.

The variable log 2MinCUDQPSize specifies the minimum coding unit size that can further modify the value of QPY as follows: log 2MinCUDQPSize=Log 2MaxCUSize−max_cu_ qp_delta_depth. alf_param( ) is a function that determines the adaptive loop filter parameter syntax. rbsp- _trailing_bits( ) is a function that corresponds to a stop bit (equal to 1) followed by zero bits until byte alignment is achieved.

Listing (6) below illustrates an example of a bitstream syntax modification required to signal the wrap indicator in the slice header:

Listing (6)

```
/* Slice header RBSP syntax
*/
slice_header_rbsp( ) {
    lightweight_slice_flag
    if( !lightweight_slice_flag ) {
        slice_type
        pic_parameter_set_id
        if( IdrPicFlag )
            idr_pic_id
        pic_order_cnt
        wrap_indicator_flag
        if(!IdrPicFlag )
            buffer_description( )
        if(slice_type == P || slice_type == B ) {
            num_ref_idx_active_override_flag
            if( num_ref_idx_active_override_flag ) {
                num_ref_idx_l0_active_minus1
                if( slice_type == B )
                    num_ref_idx_l1_active_minus1
            }
        }
        ref_pic_list_modification( )
        ref_pic_list_combination( )
        if( IdrPicFlag )
            no_output_of_prior_pics_flag
    }
    if( entropy_coding_mode_flag && slice_type != I)
        cabac_init_idc
    first_slice_in_pic_flag
    if( first_slice_in_pic_flag == 0 )
        slice_address
    if( !lightweight_slice_flag ) {
        slice_qp_delta
        if( sample_adaptive_offset_enabled_flag )
            sao_param( )
        if( deblocking_filter_control_present_flag ) {
            disable_deblocking_filter_idc
            if( disable_deblocking_filter_idc != 1 ) {
                slice_alpha_c0_offset_div2
                slice_beta_offset_div2
            }
        }
        if( slice_type == B )
            collocated_from_10_flag
        if( adaptive_loop_filter_enabled_flag ) {
            if( !shared_pps_info_enabled_flag )
                alf_param( )
            alf_cu_control_param( )
        }
    }
}
```

A lightweight_slice_flag equal to 1 specifies that the value of slice header syntax elements not present shall be inferred to be equal to the value of slice header syntax elements in a proceeding slice. A lightweight_slice_flag equal to 0 specifies that the value of slice header syntax element values are transmitted in the current slice header. slice_type specifies the coding type of the slice P, B or I.

idr_pic_id identifies an instantaneous decoding refresh (IDR) picture. The values of idr_pic_id in all the slices of an IDR picture shall remain unchanged. When two consecutive access units in decoding order are both IDR access units, the value of idr_pic_id in the slices of the first such IDR access unit shall differ from the idr_pic_id in the second such IDR access unit. The value of idr_pic_id shall be in the range of 0 to 65535, inclusive.

pic_order_cnt specifies the picture order count of a coded picture and is used as an identifier in a buffer description application process and reference picture list creation processes. The pic_order_cnt syntax element shall be represented by log 2_max_pic_order_cnt_minus4+4 bits. The value of pic_order_cnt shall be in the range of 0 to MaxPOC−1, inclusive.

num_ref_idx_active_override_flag equal to 1 specifies that the syntax element num_ref_idx_l0_active_minus1 is present for P and B slices and that the syntax element num_ref_idx_l1_active_minus1 is present for B slices. num_ref_idx_active_override_flag equal to 0 specifies that the syntax elements num_ref_idx_l0_active_minus1 and num_ref_idx_l1_active_minus1 are not present.

When the current slice is a P or B slice and field_pic_flag is equal to 0 and the value of num_ref_idx_l0_default_active_minus1 in the picture parameter set exceeds 15, num_ref_idx_active_override_flag shall be equal to 1. When the current slice is a B slice and field_pic_flag is equal to 0 and the value of num_ref_idx_l1_default_active_minus1 in the picture parameter set exceeds 15, num_ref_idx_active_override_flag shall be equal to 1. num_ref_idx_l0_active_minus1 specifies the maximum reference index for reference picture list 0 that shall be used to decode the slice.

When the current slice is a P or B slice and num_ref_idx_l0_active_minus1 is not present, num_ref_idx_l0_active_minus1 shall be inferred to be equal to num_ref_idx_l0_default_active_minus1. The range of num_ref_idx_l0_active_minus1 is specified as follows. If field_pic_flag is equal to 0, num_ref_idx_l0_active_minus1 shall be in the range of 0 to 15, inclusive. When MbaffFrameFlag is equal to 1, num_ref_idx_l0_active_minus1 is the maximum index value for the decoding of frame macroblocks and 2* num_ref_idx_l0_active_minus1+1 is the maximum index value for the decoding of field macroblocks. Otherwise, (when field_pic_flag is equal to 1), num_ref_idx_l0_active_minus1 shall be in the range of 0 to 31, inclusive.

num_ref_idx_l1_active_minus1 specifies the maximum reference index for reference picture list 1 that shall be used to decode the slice. When the current slice is a B slice and num_ref_idx_l1_active_minus1 is not present, num_ref_idx_l1_active_minus1 shall be inferred to be equal to num_ref_idx_l1_default_active_minus1. The range of num_ref_idx_l1_active_minus1 is constrained as specified in the semantics for num_ref_idx_l0_active_minus1 with l0 and list 0 replaced by l1 and list 1, respectively.

no_output_of_prior_pics_flag specifies how the previously-decoded pictures in the decoded picture buffer are treated after decoding of an IDR picture. When the IDR picture is the first IDR picture in the bitstream, the value of no_output_of_prior_pics_flag has no effect on the decoding process. When the IDR picture is not the first IDR picture in the bitstream and the value of PicWidthInMbs, FrameHeightInMbs, or max_dec_frame_buffering derived from the active sequence parameter set is different from the value of PicWidthInMbs, FrameHeightInMbs, or max_dec_frame_buffering derived from the sequence parameter set active for the preceding picture, no_output_of_prior_pics_flag equal to 1 may (but should not) be inferred by the decoder, regardless of the actual value of no_output_of_prior_pics_flag.

cabac_init_idc specifies the index for determining the initialization table used in the initialization process for context variables. The value of cabac_init_idc shall be in the range of 0 to 2, inclusive.

first_slice_in_pic_flag indicates whether the slice is the first slice of the picture. If first_slice_in_pic_flag is equal to 1, the variables SliceAddress and LCUAddress are both set to 0 and the decoding starts with the first largest coding unit (LCU) in the picture.

slice_address specifies the address in slice granularity resolution in which the slice starts and shall be represented by (Ceil(Log 2(NumLCUsInPicture))+SliceGranularity) bits in the bitstream where NumLCUsInPicture is the number of LCUs in a picture. The variable LCUAddress is set to (slice_address>>SliceGranularity) and represents the LCU part of the slice address in raster scan order. The variable GranularityAddress is set to (slice_address–(LCUAddress<<SliceGranularity)) and represents the sub-LCU part of the slice address expressed in z-scan order. The variable SliceAddress is then set to (LCUAddress<<(log 2_diff_max_min_coding_block_size<<1))+(Granularity-Address<<((log 2_diff_max_min_coding_block_size<<1)–SliceGranularity) and the slice decoding starts with the largest coding unit possible at the slice starting coordinate.

slice_qp_delta specifies the initial value of the luma quantization parameter QPY to be used for all the macroblocks in the slice until modified by the value of cu_qp_delta in the coding unit layer. The initial QPY quantization parameter for the slice is computed as: SliceQPY=26+pic_init_qp_minus26+slice_qp_delta. The value of slice_qp_delta shall be limited such that SliceQPY is in the range of –QpBdOffsetY to +51, inclusive. "QpBdOffsetY=6* bit_depth_luma_minus8" specifies the value of the luma quantization parameter range offset. "bit_depth_luma_minus8+8" specifies the bit depth of the samples of the luma array. pic_init_qp_minus26 specifies the initial value minus 26 of SliceQPY for each slice.

A collocated_from_l0_flag equal to 1 specifies the picture that contains the co-located partition shall be derived from list 0, otherwise the picture shall be derived from list 1. ref_pic_list_modification( ) is a function that identifies the syntax of reference picture list modification. ref_pic_list_combination( ) is a function that identifies the syntax of reference picture list combination. alf_cu_control_param( ) is a function that identifies the syntax of adaptive loop filter coding unit control parameter. sao_param( ) is a function that identifies the syntax of sample adaptive offset parameter.

A disable_deblocking_filter_idc equal to 1 disables the application of the deblocking filter for certain block edges. A disable_deblocking_filter_idc equal to 0 enables the application of the deblocking filter for certain block edges. The deblocking process is controlled using values of syntax elements slice_alpha_c0_offset_div 2 and slice_beta_offset_div 2.

Listing (7) below illustrates an example of a bitstream syntax modification required to signal the wrap indicator in the Adaptation Parameter Set (APS):

Listing (7)

```
/* Adaptation parameter set RBSP syntax
*/
aps_rbsp( ) {
aps_id
    wrap_indicator_flag
aps_sample_adaptive_offset_flag
aps_adaptive_loop_filter_flag
if( aps_sample_adaptive_offset_flag ||
aps_adaptive_loop_filter_flag ) {
    aps_cabac_use_flag
    if( aps_cabac_use_flag ) {
        aps_cabac_init_idc
        aps_cabac_init_qp_minus26
```

Listing (7)

```
    }
}
if( aps_adaptive_loop_filter_flag ) {
    alf_data_byte_count /* to enable skipping past data without
        parsing it */
    /*    byte_align( ) this byte align happens between the non-CABAC
    and CABAC parts of the alf_param( ). Once there is an all CABAC
    alf_param( ), enable this byte_align( ) */
        alf_param( )
        byte_align( )
    }
if( aps_sample_adaptive_offset_flag ) {
    sao_data_byte_count /* to enable skipping past data without
        parsing it */
byte_align( )
sao_param( )
/*    byte_align( ) this final byte align unnecessary as being taken care
of by rbsp_trailing_bits( ) */
        rbsp_trailing_bits( )
}
``` aps_id identifies the adaptation parameter set that is referred to in the slice header. An aps_sample_adaptive_offset_flag equal to 1 specifies that the SAO is on for slices referred to the current APS. When equal to 0, it specifies that the SAO is off for slices referred to the current APS. If there is no active APS, the aps_sample_adaptive_offset_flag value is inferred to be 0.

An aps_adaptive_loop_filter_flag equal to 1 specifies that the ALF is on for slices referred to the current APS. When equal to 0, it specifies that the ALF is off for slices referred to the current APS. If there is no active APS, the aps_adaptive_loop_filter_flag value is inferred to be 0.

An aps_cabac_use_flag equal to 1 specifies that the CABAC decoding process shall be used for sao_param( ) when present and used for alf_param( ) when present. When equal to 0, it specifies that the CAVLC decoding process shall be used for sao_param( ) when present and used for alf_param( ) when present.

aps_cabac_init_idc specifies the index for determining the initialization table used in the initialization process for context variables of SAO and ALF. The value of cabac_init_idc shall be in the range of 0 to 2, inclusive. aps_cabac_init_qp_minus26 specifies a quantization parameter minus 26 wherein the quantization parameter is used in the initialization process for context variables of SAO and ALF. alf_data_byte_count specifies a number of bytes. sao_data_byte_point specifies a number of bytes. byte_align( ) inserts 0 to 7 bits until alignment is reached.

Figure 12:
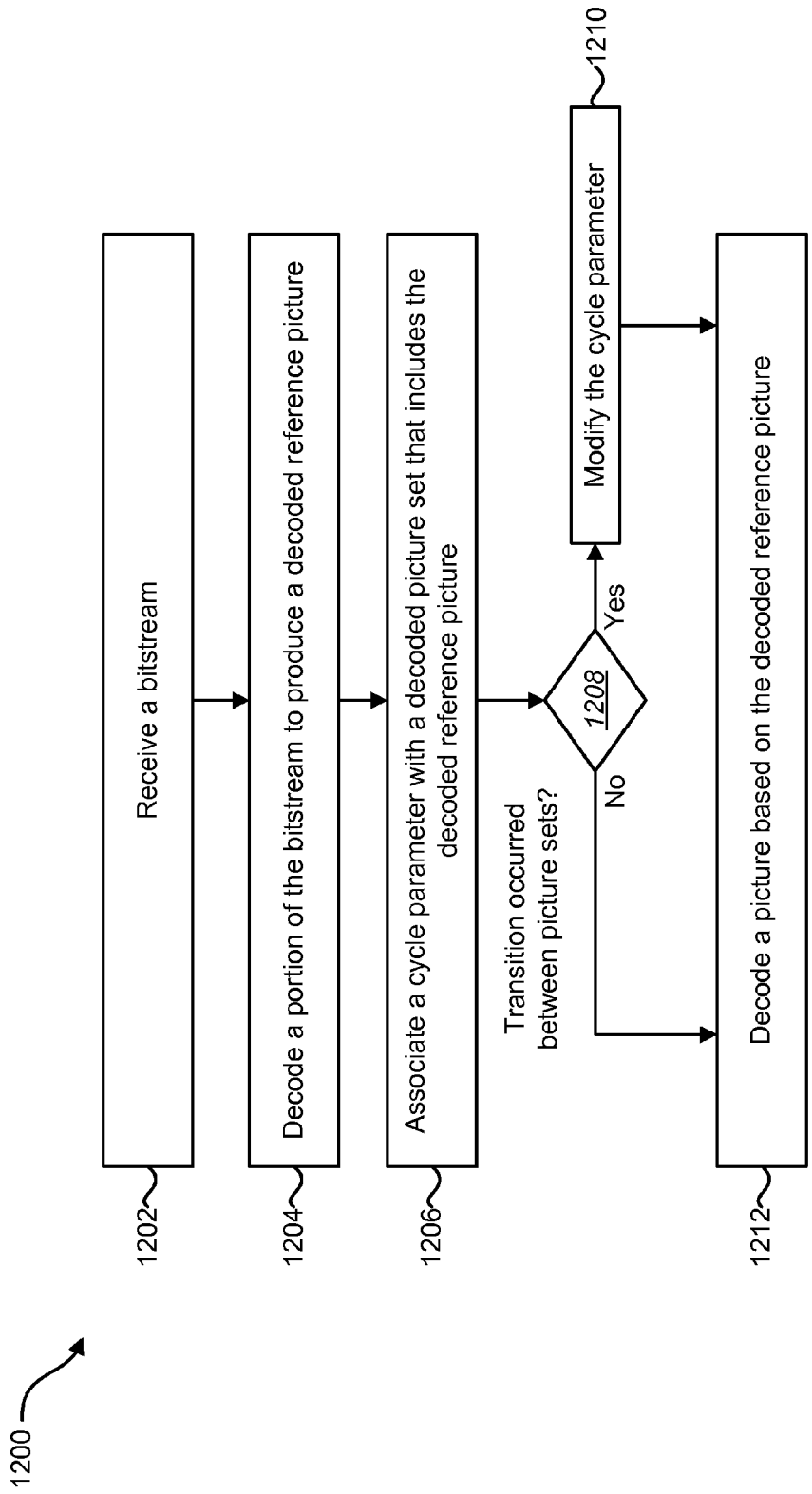
FIG. 12 is a flow diagram illustrating another more specific configuration of a method for tracking a reference picture with reduced overhead referencing based on a designated picture.

FIG. 12 is a flow diagram illustrating another more specific configuration of a method 1200 for tracking a reference picture with reduced overhead referencing based on a designated picture. This method 1200 may be another approach for tracking which picture is being referenced when POCs are reused. An electronic device 204 (e.g., decoder 202) may receive 1202 a bitstream. For example, the decoder 202 may receive 1202 a bitstream 214 that includes an encoded reference picture. In some configurations, the bitstream 214 may also include overhead information (e.g., PPS, buffer description information, parameters, reference picture designation or identifier, etc.).

The electronic device 204 may decode 1204 a portion of the bitstream to produce a decoded reference picture. For example, the decoder 202 may decode 1204 a portion of the bitstream 214 to produce a decoded reference picture that is stored in frame memory 264. It should be noted that one or more portions of the bitstream 214 may be decoded 404 to produce one or more decoded reference pictures.

The electronic device 204 may associate 1206 a cycle parameter with a decoded picture set that includes the decoded reference picture. For example, the electronic device 204 may associate 1206 a cycle parameter "poc_cycle" with a decoded picture set or each picture in a decoded picture set that includes the decoded reference picture. The cycle parameter "poc_cycle" is described in greater detail above.

The electronic device 204 may determine 1208 whether a transition has occurred between picture sets. For example, the transition may be determined 1208 by examining the POC of a current picture being decoded (e.g., CurPOC) and comparing it to the POC of the last picture that was decoded (e.g., LastPOC). For instance, if the POC of the current picture (e.g., CurPOC) being decoded is less than the POC of the last decoded picture (e.g., LastPOC) and LastPOC−CurPOC is greater than a threshold TH_FWD, then a transition from an earlier picture set to a later picture set may be determined 1208. However, if the POC of the current picture being decoded (e.g., CurPOC) is greater than the POC of the last picture that was decoded (e.g., LastPOC) and CurPOC−LastPOC is greater than a threshold TH_BCKWD, then a transition from a later picture set to an earlier picture set may be determined 1208. For all other cases, it may be determined 1208 that no transition has occurred. In some configurations, the thresholds may take on values TH_FWD=TH_BCKWD=MaxPOC/2.

If the electronic device 204 determines 1208 that a transition has occurred between two picture sets, the electronic device 204 may modify 1210 the cycle parameter. For example, the electronic device 204 may decrement cycle parameters for each picture or each set of pictures in the DPB when the transition is from an earlier picture set. In another example, the electronic device 204 may increment the cycle parameters for each picture or each set of pictures in the DPB when the transition is from a later picture set. Thus, an update of all reference picture cycle parameters may be carried out with respect to the picture being decoded. This update procedure (e.g., determining 1208 whether a transition has occurred between picture sets and possibly modifying 1210 the cycle parameter(s)) may be executed once for each picture being decoded.

One alternative definition of the cycle parameter "poc_cycle" may be that the poc_cycle for the picture (currently) being decoded is 0. Thus, the set of pictures that includes the picture currently being decoded may be 0.

The poc_cycle of any other picture, such as the reference picture, may be calculated as the MaxPOCSetIndex of the reference picture minus the MaxPOCSetIndex of the picture being decoded. For example, if the MaxPOCSetIndex of the picture being decoded is n and the reference picture has a MaxPOCSetIndex that is n−1, then the poc_cycle of the reference picture may be (n−1)−n=−1.

It should be noted that the poc_cycle for a reference picture may depend on the MaxPOCSetIndex distance between the reference picture and the picture being decoded. This can be determined implicitly by keeping track of transitions (e.g., determining 1208 whether a transition has occurred) between one picture set of [0, . . . , MaxPOC−1] and the other picture set [0, . . . , MaxPOC−1] at both the encoder 108 and decoder 102.

The electronic device 204 may decode 1212 a picture based on the decoded reference picture. For example, a portion of the bitstream 214 (other than the portion decoded 1204 to produce the decoded reference picture) may be decoded 1212 based on the decoded reference picture. For example, the decoded reference picture (that has been tracked in the DPB) may be provided to a motion compensation module 260 in order to generate an inter-frame prediction signal 268 based on an inter-frame prediction mechanism. The inter-frame prediction signal 268 may then be used to decode 1212 the picture. In some configurations or instances, one or more decoded reference pictures may be used to decode 1212 the picture.

Figure 13:
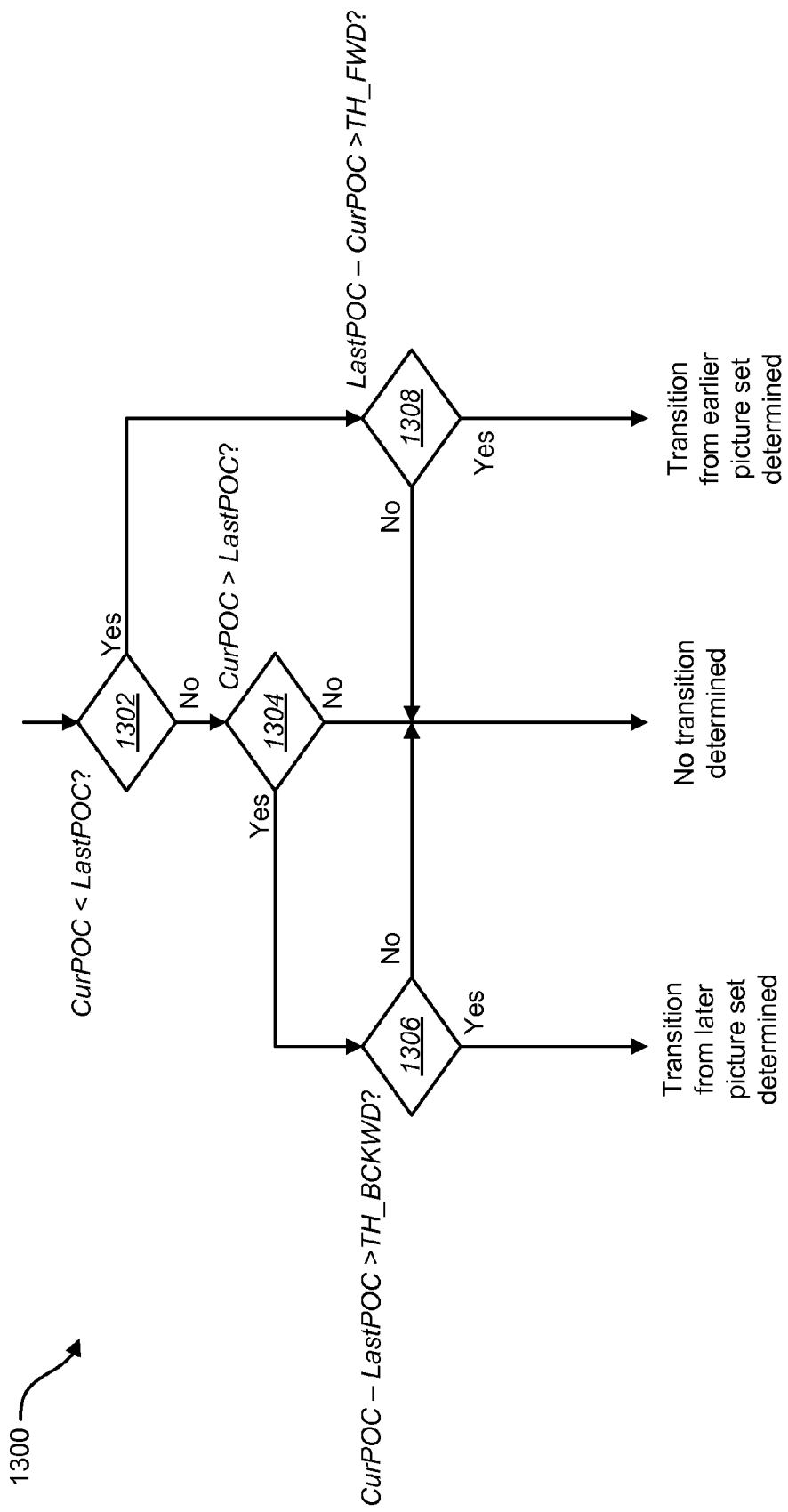
FIG. 13 is a flow diagram illustrating one configuration of a method for determining whether a transition has occurred between picture sets.

FIG. 13 is a flow diagram illustrating one configuration of a method 1300 for determining whether a transition has occurred between picture sets. For example, FIG. 13 provides one example of determining 1208 whether a transition has occurred between picture sets as illustrated in FIG. 12. The electronic device 204 may determine 1302 whether the POC of the current picture being decoded (denoted "CurPOC," for example) is less than the POC of the last decoded picture (denoted "LastPOC," for example). For instance, the electronic device 204 may compare a POC of a current picture being decoded (e.g., CurPOC) to a POC of a picture that was decoded last (e.g., LastPOC) to make this determination 1302.

If CurPOC<LastPOC, the electronic device 204 may determine 1308 whether LastPOC−CurPOC is greater than a threshold TH_FWD. If LastPOC−CurPOC is greater than a threshold TH_FWD, the electronic device 204 may determine 1308 that a transition from an earlier picture set to a later picture set has occurred. However, if LastPOC−CurPOC is not greater than TH_FWD, the electronic device 204 may determine 1308 that no transition has occurred.

If CurPOC is not less than LastPOC, then the electronic device 204 may determine 1304 whether CurPOC is greater than LastPOC. If the electronic device 204 determines 1304 that CurPOC is greater than LastPOC, then the electronic device 204 may determine 1306 whether CurPOC−LastPOC is greater than a threshold TH_BCKWD. If the electronic device determines 1306 that CurPOC−LastPOC is greater than a threshold TH_BCKWD, then the electronic device 204 may determine 1306 that a transition from a later picture set to an earlier picture set has occurred. If the electronic device determines 1306 that CurPOC−LastPOC is not greater than a threshold TH_BCKWD, then the electronic device 204 may determine 1306 that no transition has occurred.

If the electronic device 204 determines 1304 that CurPOC is not greater than LastPOC, the electronic device may determine 1304 that no transition has occurred. In some configurations, the thresholds may take on values TH_FWD=TH_BCKWD=MaxPOC/2.

Figure 14:
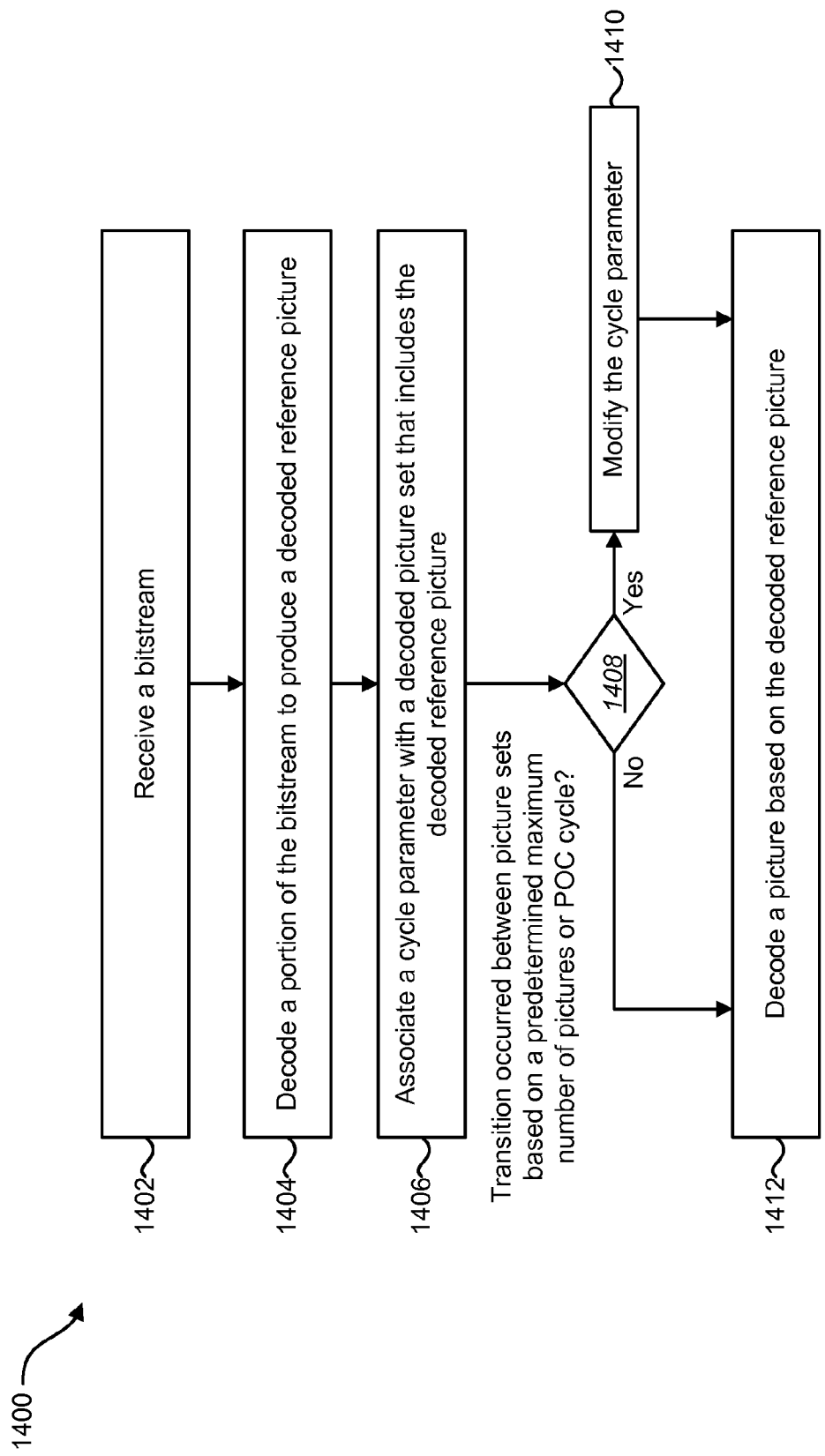
FIG. 14 is a flow diagram illustrating another more specific configuration of a method for tracking a reference picture with reduced overhead referencing based on a designated picture.

FIG. 14 is a flow diagram illustrating another more specific configuration of a method 1400 for tracking a reference picture with reduced overhead referencing based on a designated picture. This method 1400 may be one approach for tracking which picture is being referenced when POCs are reused. An electronic device 204 (e.g., decoder 202) may receive 1402 a bitstream 214. For example, the decoder 202 may receive 1402 a bitstream 214 that includes an encoded reference picture (and other encoded pictures, for instance). In some configurations, the bitstream 214 may include overhead information (e.g., PPS, buffer description information, parameters, reference picture designation or identifier, etc.).

The electronic device 204 may decode 1404 a portion of the bitstream 214 to produce a decoded reference picture. For example, the decoder 202 may decode 1404 a portion of the bitstream 214 to produce a decoded reference picture that is stored in frame memory 264. It should be noted that one or more portions of the bitstream 214 may be decoded 1404 to produce one or more decoded reference pictures.

The electronic device 204 may associate 1406 a cycle parameter with a decoded picture set that includes the decoded reference picture. For example, the electronic device 204 may associate 1406 a cycle parameter "poc_cycle" with a decoded picture set that includes the decoded reference picture.

The electronic device 204 may determine 1408 whether a transition has occurred between picture sets. For example, each time a decoder 102 decodes a predetermined number of pictures in a set of pictures, the decoder 102 or electronic device B 104b may determine 1408 that a transition has occurred between two picture sets. In another example, each time a decoder 102 detects a cycle in POC (e.g., restarting from a maximum value to a minimum value), the decoder 102 or electronic device B 104b may determine 1408 that a transition has occurred between two picture sets.

If the electronic device 204 determines 1408 that a transition has occurred between picture sets, the electronic device 204 may modify 1410 (e.g., decrement) the cycle parameter. For example, the electronic device 204 decrements cycle parameters for each picture or each set of pictures in the DPB. In another example, the electronic device 204 may increment the cycle parameter.

The electronic device 204 may decode 1412 a picture based on the decoded reference picture. For example, a portion of the bitstream 214 (other than the portion decoded 1404 to produce the decoded reference picture) may be decoded 1412 based on the reference picture. For instance, the decoded reference picture (that has been tracked in the DPB) may be provided to a motion compensation module 260 in order to generate an inter-frame prediction signal 268 based on an inter-frame prediction mechanism. The inter-frame prediction signal 268 may then be used to decode 1412 the picture. In some configurations or instances, one or more decoded reference pictures may be used to decode 1412 the picture.

Figure 15:
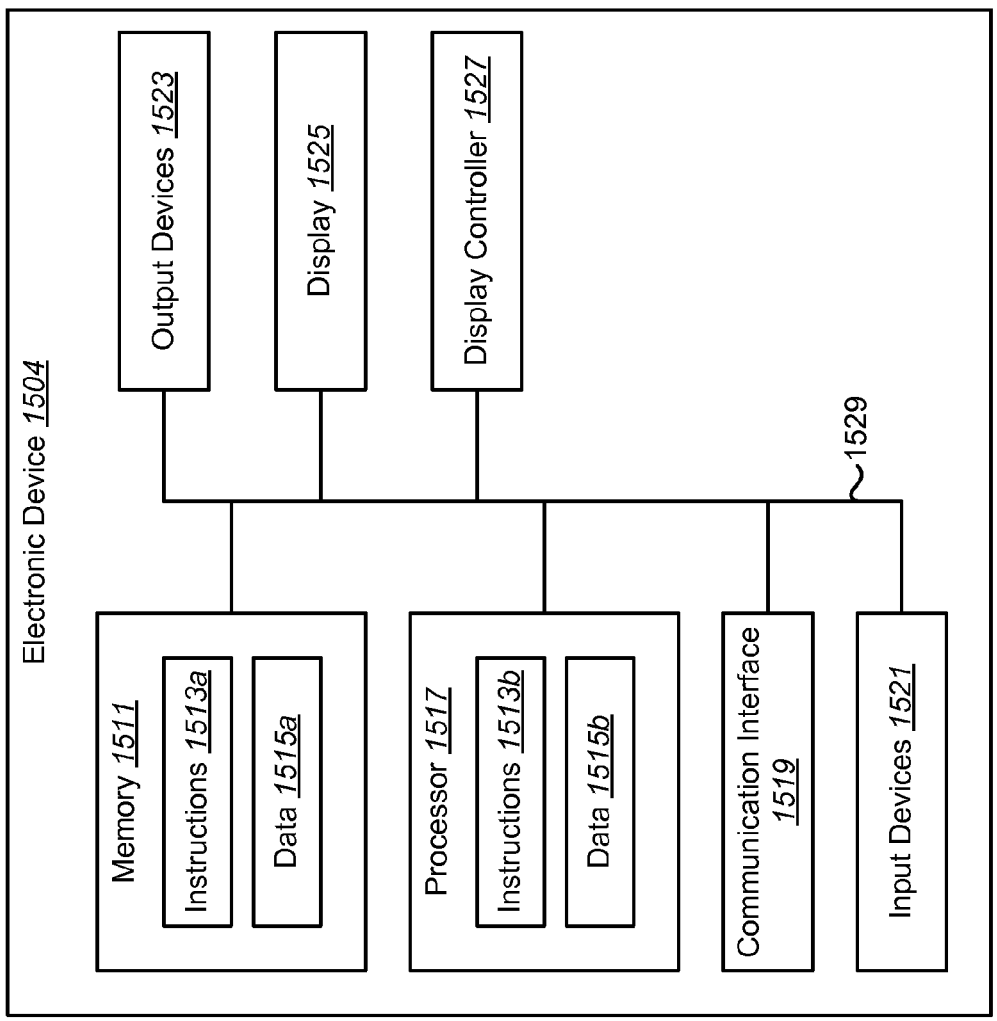
FIG. 15 illustrates various components that may be utilized in an electronic device.

FIG. 15 illustrates various components that may be utilized in an electronic device 1504. The electronic device 1504 may be implemented as one or more of the electronic devices (e.g., electronic devices 104, 204) described previously.

The electronic device 1504 includes a processor 1517 that controls operation of the electronic device 1504. The processor 1517 may also be referred to as a CPU. Memory 1511, which may include both read-only memory (ROM), random access memory (RAM) or any type of device that may store information, provides instructions 1513a (e.g., executable instructions) and data 1515a to the processor 1517. A portion of the memory 1511 may also include non-volatile random access memory (NVRAM). The memory 1511 may be in electronic communication with the processor 1517.

Instructions 1513b and data 1515b may also reside in the processor 1517. Instructions 1513b and/or data 1515b loaded into the processor 1517 may also include instructions 1513a and/or data 1515a from memory 1511 that were loaded for execution or processing by the processor 1517. The instructions 1513b may be executed by the processor 1517 to implement the systems and methods disclosed herein.

The electronic device 1504 may include one or more communication interfaces 1519 for communicating with other electronic devices. The communication interfaces 1519 may be based on wired communication technology, wireless communication technology, or both. Examples of communication interfaces 1519 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, a wireless transceiver in accordance with $3^{rd}$ Generation Partnership Project (3GPP) specifications and so forth.

The electronic device 1504 may include one or more output devices 1523 and one or more input devices 1521. Examples of output devices 1523 include a speaker, printer, etc. One type of output device that may be included in an electronic device 1504 is a display device 1525. Display devices 1525 used with configurations disclosed herein may utilize any suitable image projection technology, such as a cathode ray tube (CRT), liquid crystal display (LCD), light-emitting diode (LED), gas plasma, electroluminescence or the like. A display controller 1527 may be provided for converting data stored in the memory 1511 into text, graphics, and/or moving images (as appropriate) shown on the display 1525. Examples of input devices 1521 include a keyboard, mouse, microphone, remote control device, button, joystick, trackball, touchpad, touchscreen, lightpen, etc.

The various components of the electronic device 1504 are coupled together by a bus system 1529, which may include a power bus, a control signal bus and a status signal bus, in addition to a data bus. However, for the sake of clarity, the various buses are illustrated in FIG. 15 as the bus system 1529. The electronic device 1504 illustrated in FIG. 15 is a functional block diagram rather than a listing of specific components.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods or approaches described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for tracking a reference picture on an electronic device, comprising:
   receiving a bitstream;
   decoding a portion of the bitstream to produce a decoded reference picture;
   tracking the decoded reference picture in a decoded picture buffer (DPB) with reduced overhead referencing based on a designated picture, wherein the tracking is based on a signaled wrap indicator, wherein the wrap indicator indicates a transition between two sets of pictures; and
   decoding a picture based on the decoded reference picture.

2. The method of claim 1, wherein the designated picture is an instantaneous decoding refresh (IDR) picture.

3. The method of claim 1, wherein tracking the decoded reference picture comprises determining a cycle parameter based on the designated picture.

4. The method of claim 3, wherein the cycle parameter is reset based on the designated picture.

5. The method of claim 1, wherein tracking the decoded reference picture comprises determining a picture order count (POC) based on the designated picture.

6. The method of claim 5, wherein a picture order count (POC) sequence is reset based on the designated picture.

7. The method of claim 1, wherein a buffer description of the decoded reference picture comprises a picture order count (POC), a cycle parameter, a temporal identifier and a scaling parameter.

8. The method of claim 1, wherein a resolution of the decoded reference picture is different from a resolution of the picture.

9. The method of claim 8, wherein the method further comprises processing transform coefficients of the decoded reference picture based on a scaling parameter to decode the picture.

10. The method of claim 1, wherein tracking the decoded reference picture comprises tracking a decoded reference picture collection that includes the decoded reference picture.

11. The method of claim 1, wherein tracking the decoded reference picture comprises:
    obtaining a buffer description; and
    modifying the buffer description.

12. The method of claim 11, wherein modifying the buffer description comprises at least one of deleting an entry, adding an entry and replacing an entry.

13. An electronic device configured for tracking a reference picture, comprising:
    a processor;
    memory in electronic communication with the processor;
    instructions stored in the memory, the instructions being executable to:
    receive a bitstream;
    decode a portion of the bitstream to produce a decoded reference picture;
    track the decoded reference picture in a decoded picture buffer (DPB) with reduced overhead referencing based on a designated picture, wherein the tracking is based on a signaled wrap indicator, wherein the wrap indicator indicates a transition between two sets of pictures; and
    decode a picture based on the decoded reference picture.

14. The electronic device of claim 13, wherein the designated picture is an instantaneous decoding refresh (IDR) picture.

15. The electronic device of claim 13, wherein tracking the decoded reference picture comprises determining a cycle parameter based on the designated picture.

16. The electronic device of claim 15, wherein the cycle parameter is reset based on the designated picture.

17. The electronic device of claim 13, wherein tracking the decoded reference picture comprises determining a picture order count (POC) based on the designated picture.

18. The electronic device of claim 17, wherein a picture order count (POC) sequence is reset based on the designated picture.

19. The electronic device of claim 13, wherein a buffer description of the decoded reference picture comprises a picture order count (POC), a cycle parameter, a temporal identifier and a scaling parameter.

20. The electronic device of claim 13, wherein a resolution of the decoded reference picture is different from a resolution of the picture.

21. The electronic device of claim 20, wherein the instructions being further executable to process transform coefficients of the decoded reference picture based on a scaling parameter to decode the picture.

22. The electronic device of claim 13, wherein tracking the decoded reference picture comprises tracking a decoded reference picture collection that includes the decoded reference picture.

23. The electronic device of claim 13, wherein tracking the decoded reference picture comprises:
    obtaining a buffer description; and
    modifying the buffer description.

24. The electronic device of claim 23, wherein modifying the buffer description comprises at least one of deleting an entry, adding an entry and replacing an entry.

* * * * *